United States Patent
Kumar et al.

(10) Patent No.: US 12,399,957 B2
(45) Date of Patent: Aug. 26, 2025

(54) REINFORCEMENT LEARNING SIMULATION OF SUPPLY CHAIN GRAPH

(71) Applicant: Microsoft Technology Licensing, LLC, Redmond, WA (US)

(72) Inventors: Peeyush Kumar, Seattle, WA (US); Hui Qing Li, Seattle, WA (US); Vaishnavi Nattar Ranganathan, Woodinville, WA (US); Lillian Jane Ratliff, Seattle, WA (US); Ranveer Chandra, Kirkland, WA (US); Vishal Jain, Bengaluru (IN); Michael McNab Bassani, Seattle, WA (US); Jeremy Randall Reynolds, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 905 days.

(21) Appl. No.: 17/457,874

(22) Filed: Dec. 6, 2021

(65) Prior Publication Data

US 2023/0129665 A1    Apr. 27, 2023

(30) Foreign Application Priority Data

Oct. 22, 2021   (IN) .............................. 202141048296

(51) Int. Cl.
*G06F 18/20* (2023.01)
*G06F 16/90* (2019.01)
(Continued)

(52) U.S. Cl.
CPC ........ *G06F 18/295* (2023.01); *G06F 18/2148* (2023.01); *G06F 18/2185* (2023.01); *G06Q 10/08* (2013.01); *G06F 16/90* (2019.01)

(58) Field of Classification Search
CPC ............... G06F 18/295; G06F 18/2148; G06F 18/2185; G06F 16/90; G06Q 10/08
See application file for complete search history.

(56) References Cited

U.S. PATENT DOCUMENTS

2022/0180026 A1*   6/2022   Barat ..................... G06N 3/006

OTHER PUBLICATIONS

"FarmBeats: AI, Edge & IoT for Agriculture", Retrieved from: https://www.microsoft.com/en-us/research/project/farmbeats-iot-agriculture/, May 2015, 3 Pages.
(Continued)

*Primary Examiner* — A. Hunter Wilder
(74) *Attorney, Agent, or Firm* — Alleman Hall & Tuttle LLP

(57) ABSTRACT

A computing system including a processor configured to receive training data including, for each of a plurality of training timesteps, training forecast states associated with respective training-phase agents included in a training supply chain graph. The processor may train a reinforcement learning simulation of the training supply chain graph using the training data via policy gradient reinforcement learning. At each training timestep, the training forecast states may be shared between the training-phase agents during training. The processor may receive runtime forecast states associated with respective runtime agents included in a runtime supply chain graph. For a runtime agent, at the trained reinforcement learning simulation, the processor may generate a respective runtime action output associated with a corresponding runtime forecast state of the runtime agent based at least in part on the runtime forecast states. The processor may output the runtime action output.

20 Claims, 16 Drawing Sheets

(51) Int. Cl.
    *G06F 18/21*     (2023.01)
    *G06F 18/214*     (2023.01)
    *G06Q 10/08*     (2024.01)

(56) References Cited

OTHER PUBLICATIONS

"Market Data", Retrieved from: http://web.archive.org/web/20210307061458/https://www.calstrawberry.com/en-us/Market-Data, Mar. 7, 2021, 10 Pages.

"National Berry Report", Retrieved from: http://web.archive.org/web/20200919021953/https://www.calstrawberry.com/en-us/market-data/national-berry-report, Sep. 19, 2020, 12 Pages.

"Noncitrus Fruits and Nuts 2019 Summary", Retrieved from: https://downloads.usda.library.cornell.edu/usda-esmis/files/zs25x846c/0g3551329/qj72pt50f/ncit0520.pdf, May 2020, 100 Pages.

"Sample Costs to Produce and Harvest Strawberries", Retrieved from: https://coststudyfiles.ucdavis.edu/uploads/cs_public/e7/6d/e76dceb8-f0f5-4b60-bcb8-76b88d57e272/strawberrycentralcoast-2016-final2-5-1-2017.pdf, 2016, 20 Pages.

"Supply Chain Management", Retrieved from: https://dynamics.microsoft.com/en-us/supply-chain-management/overview/, Retrieved Date: Sep. 30, 2021, 9 Pages.

Sobel, Matthew J., "Continuous Stochastic Games", In Journal of Applied Probability, vol. 10, No. 3, Sep. 1973, pp. 597-604.

Daskalakis, et al., "Independent Policy Gradient Methods for Competitive Reinforcement Learning", In Repository of arXiv:2101.04233, Jan. 11, 2021, 36 Pages.

Hu, et al., "A Deep Reinforcement Learning-Based Power Resource Management for Fuel Cell Powered Data Centers", In Journal of Electronics vol. 9, No. 12, Dec. 3, 2020, pp. 1-14.

Katsov, Ilya, "Multi-agent deep reinforcement learning for multi-echelon supply chain optimization", Retrieved From: https://blog.griddynamics.com/multi-agent-deep-reinforcement-learning-multi-echelon-supply-chain-optimization/, Jun. 10, 2020, 9 Pages.

"International Search Report and Written Opinion Issued in PCT Application No. PCT/US22/044649", Mailed date: Dec. 5, 2022, 14 Pages.

Sultana, et al., "Reinforcement Learning for Multi-Product Multi-Node Inventory Management in Supply Chains", In Repository of arXiv:2006.04037v1, Jun. 7, 2020, 27 Pages.

\* cited by examiner

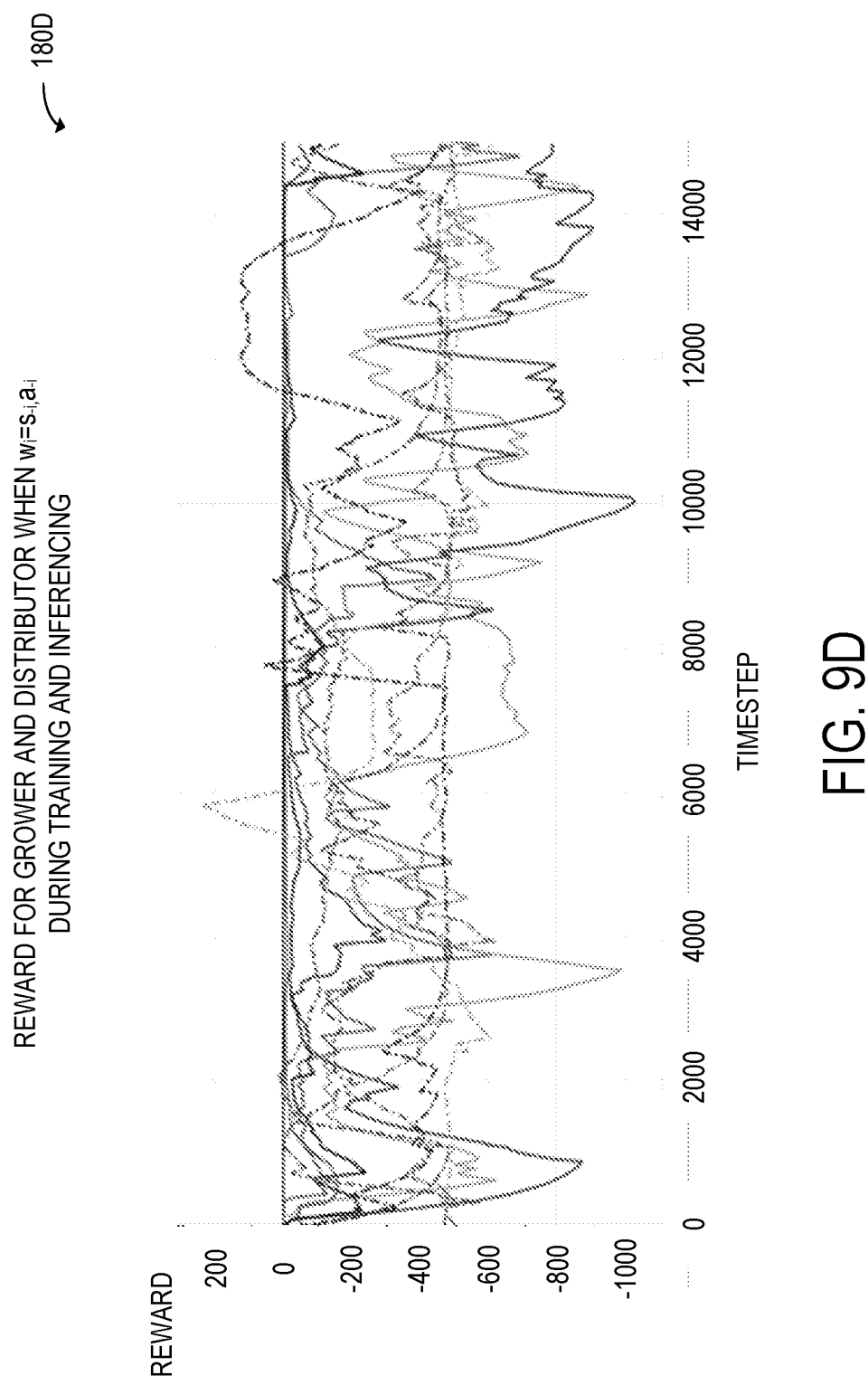

US 12,399,957 B2

REINFORCEMENT LEARNING SIMULATION OF SUPPLY CHAIN GRAPH

BACKGROUND

As the population in metropolitan regions continue to grow around the world, the foundational sectors of metropolitan operation, such as supply chain logistics, power grids, and transportation, are collectively seeing the emergence of large, interconnected networks of self-interested decision makers. In many of these networked systems, the efficiency of the overall network depends on the collective behavior of the self-motivated participants who may have at least partially conflicting interests.

These decision makers frequently operate in highly uncertain environments prone to disruptions. As data-driven paradigms become more practical and easier to implement, some decision-makers in supply-chain settings have adopted machine-learning approaches to provide forecasting mechanisms and have used these forecasts to inform their strategies. However, due to the decentralized nature of these systems, participants typically utilize local information to build local forecasts, often resulting in ill-informed decisions. In supply chains, the effect of local forecast cascading into large order backlogs upstream in the chain is referred to as the "bull-whip effect."

SUMMARY

According to one aspect of the present disclosure, a computing system is provided, including a processor configured to, during a training phase, receive training data including, for each of a plurality of training timesteps, a plurality of training forecast states associated with a respective plurality of training-phase agents included in a training supply chain graph. The processor may be further configured to train a reinforcement learning simulation of the training supply chain graph using the training data via policy gradient reinforcement learning. At each training timestep of the plurality of training timesteps, the plurality of training forecast states may be shared between simulations of the plurality of training-phase agents during training of the reinforcement learning simulation. During an inferencing phase, the processor may be further configured to receive a plurality of runtime forecast states associated with a respective plurality of runtime agents included in a runtime supply chain graph. For a runtime agent of the plurality of runtime agents, at the trained reinforcement learning simulation, based at least in part on the plurality of runtime forecast states, the processor may be further configured to generate a respective runtime action output associated with a corresponding runtime forecast state of the runtime agent for a current runtime step. The processor may be further configured to output the runtime action output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9A-9D show plots of runtime agents' rewards that were obtained as experimental results for a simulated supply chain under different information-sharing conditions, according to the example of FIG. 1.

DETAILED DESCRIPTION

Figure 1:
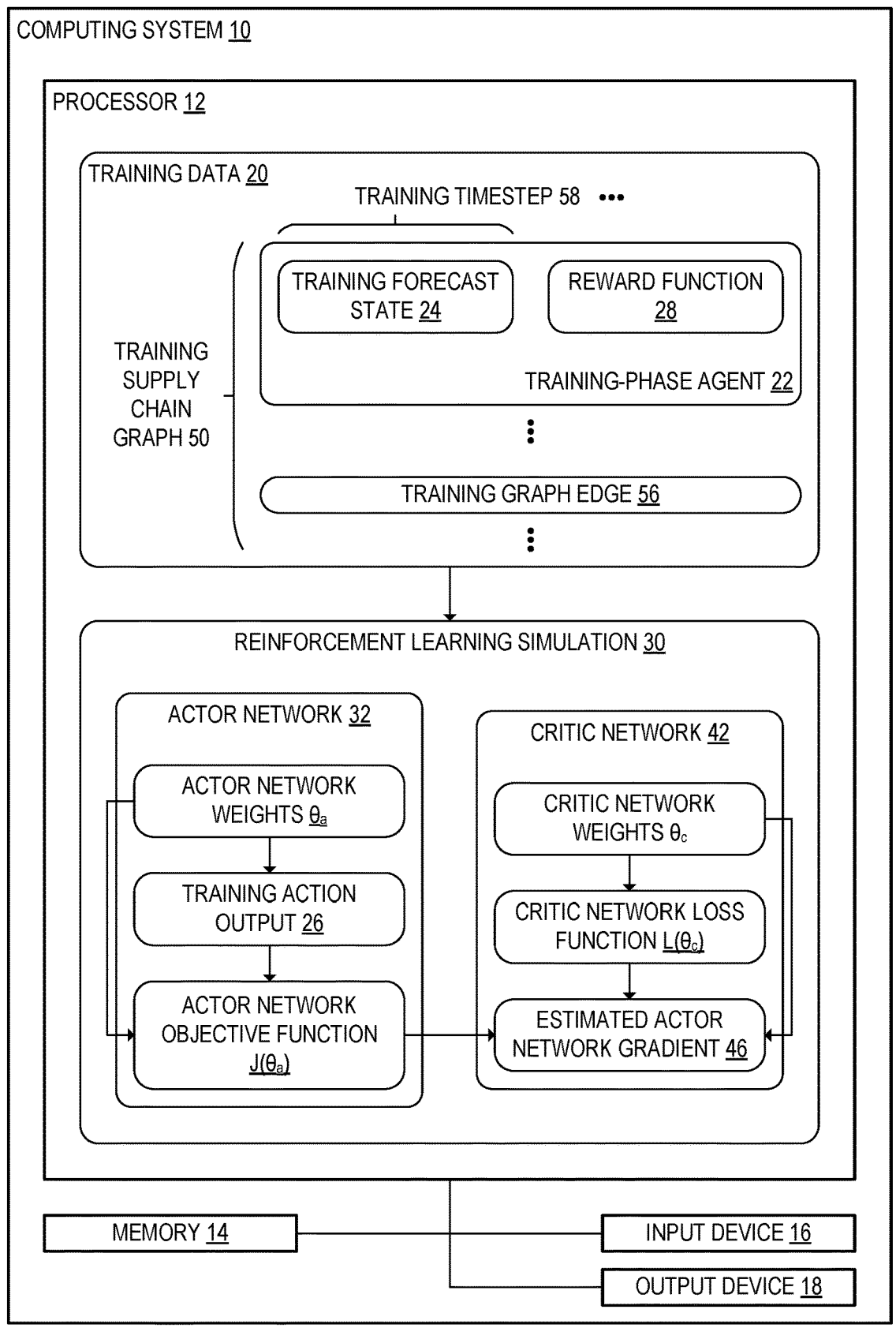
FIG. 1 schematically shows an example computing system during a training phase in which a reinforcement learning simulation is trained at a processor, according to one embodiment of the present disclosure.

To address the above challenges related to supply chain modeling and decision-making, a computing system 10 is provided, as shown in FIG. 1 according to one example embodiment. FIG. 1 shows the computing system 10 during training of a reinforcement learning simulation 30. The computing system 10 may include a processor 12, which may include one or more physical processing devices. For example, the processor 12 may be instantiated as one or more central processing unit (CPU) cores, one or more graphical processing units (GPUs), one or more hardware accelerators specialized for particular computational tasks, and/or one or more other types of processing devices.

The processor 12 may be operatively coupled to memory 14 over a data bus. The memory 14 may, for example, include volatile memory and/or non-volatile storage. In addition, the processor 12 may be coupled over the data bus to one or more input devices 16 and/or one or more output devices 18. Via the one or more input devices 16, the processor 12 may be configured to receive inputs from a user and/or from one or more other computing devices. Via the one or more output devices 18, the processor 12 may be configured to transmit outputs to the user and/or to the one or more other computing devices. The computing system 10 may, for example, include a server computing device that is configured to communicate with a client computing device over a network via the one or more input devices 16 and the one or more output devices 18.

In some examples, components (e.g., the processor 12 or the memory 14) of the computing system 10 may be distributed between a plurality of physical computing devices. For example, the plurality of physical computing devices may be a plurality of server computing devices located in a data center and communicatively coupled over a network. In such examples, one or more components of the computing system 10 may be virtualized such that respective physical components of the plurality of physical computing devices are treated as a single physical component when performing one or more computing processes at those physical components. As another example, the computing system 10 may include an Internet-of-Things (IoT) sensor array including a plurality of spatially distributed sensors, as discussed in further detail below.

Figure 2:
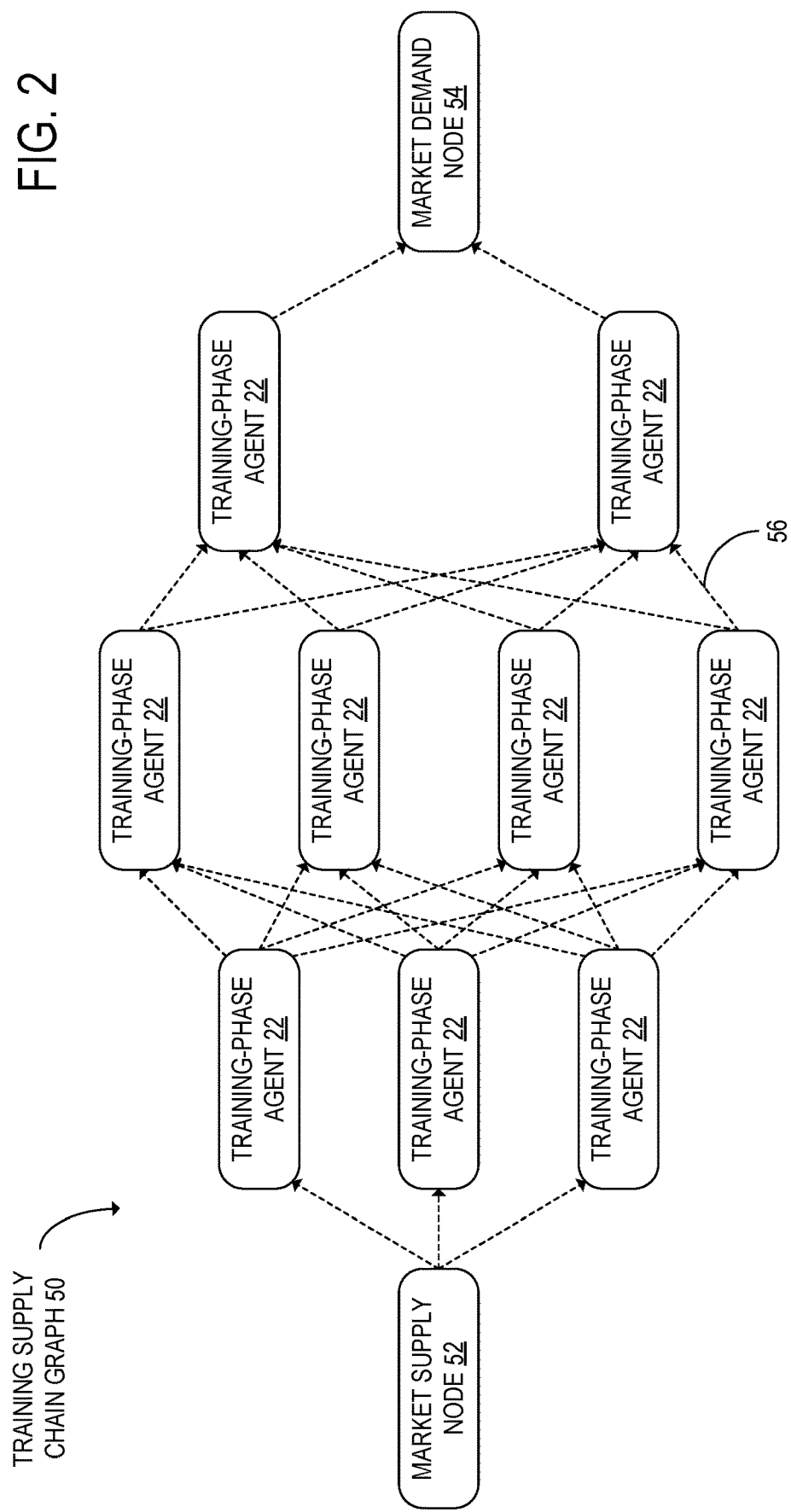
FIG. 2 shows an example training supply chain graph including a plurality of training-phase agents, according to the example of FIG. 1.

The example of FIG. 1 shows the computing system 10 during a training phase in which the reinforcement learning simulation 30 is trained. During the training phase, the processor 12 may be configured to receive training data 20. The training data 20 may be organized into a plurality of training timesteps 58 that include time series data for a plurality of training-phase agents 22. The plurality of training-phase agents 22 may be included in a training supply chain graph 50 in which the plurality of training-phase agents 22 may be connected by training graph edges 56 that represent transactions performed between the training-phase agents 22. FIG. 2 shows an example training supply chain graph 50. As shown in the example of FIG. 2, the training supply chain graph 50 may be a directed graph in which the training graph edges 56 respective directions. The directions of the training graph edges 56 may indicate directions in which materials and products move through the supply chain between training-phase agents 22.

The training supply chain graph 50 may include at least one market supply node 52 at an upstream end of the training supply chain graph 50, as shown in the example of FIG. 2. The at least one market supply node 52 may be a representation of the supply of at least one raw material to the supply chain. In addition, the training supply chain graph 50 may further include at least one market demand node 54 at a downstream end of the training supply chain graph 50. The at least one market demand node 54 may be a representation of the demand for at least one end product of the supply chain. Thus, the one or more market supply nodes 52 and the one or more market demand nodes 54 may be endpoints of the training supply chain graph 50.

Figure 3:
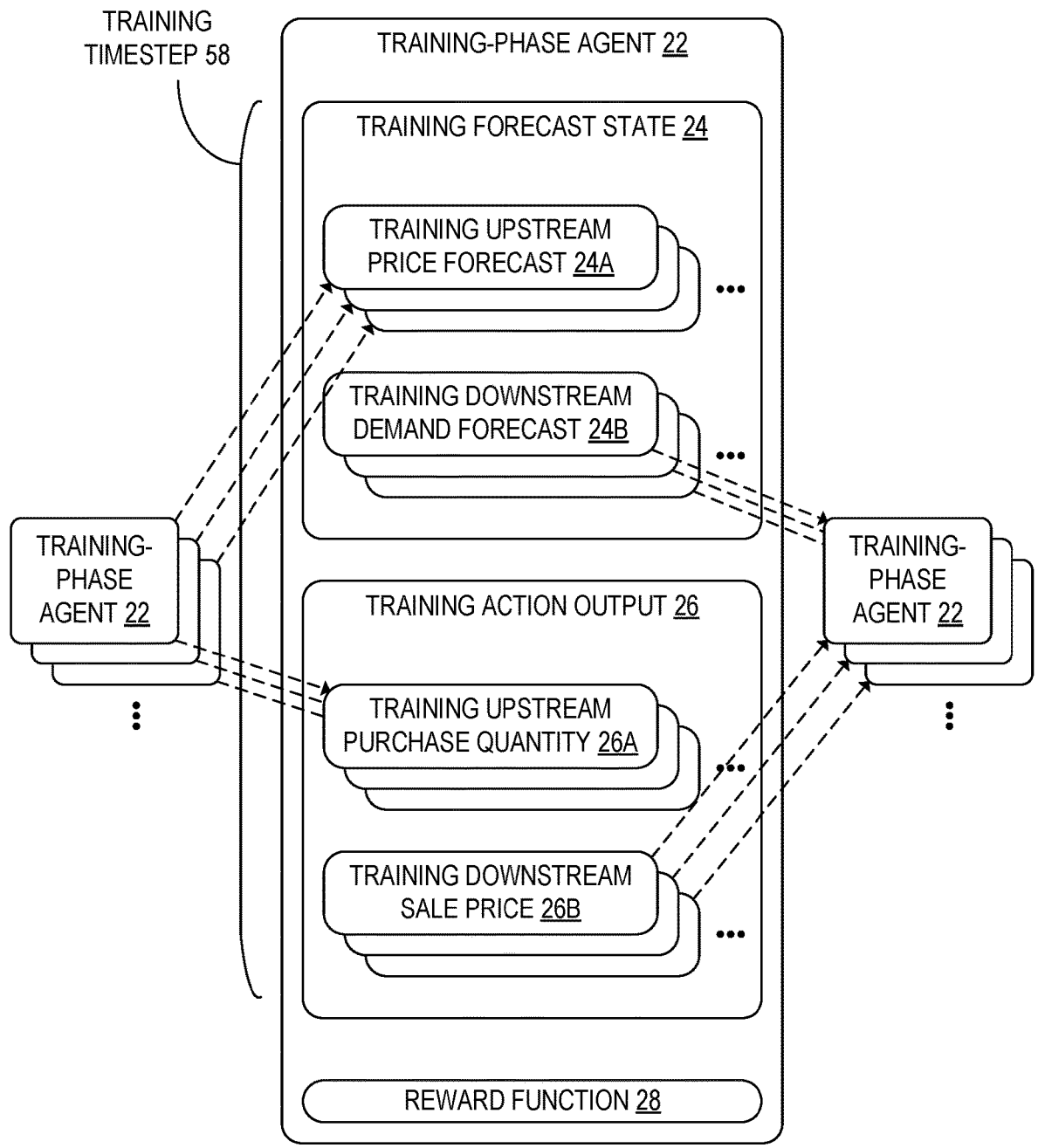
FIG. 3 schematically shows a training-phase agent included in the training supply chain graph, according to the example of FIG. 1.

Returning to FIG. 1, the training data 20 may include a plurality of training forecast states 24. Each training forecast state of the plurality of training forecast states 24 may be associated with a respective training-phase agent 22 of the plurality of training-phase agents 22 and may be a forecast of an action taken by another training-phase agent 22 at a current training timestep 58. FIG. 3 schematically shows an example training-phase agent 22 including a training forecast state 24. As depicted in the example of FIG. 3, the plurality of training forecast states 24 may include a plurality of training upstream price forecasts 24A and a plurality of training downstream demand forecasts 24B. The plurality of training upstream price forecasts 24A may be predictions of respective prices charged by one or more other training-phase agents 22 that are upstream of the training-phase agent 22 in the training supply chain graph 50. The plurality of training downstream demand forecasts 24B may be predictions of respective quantities of a product of the training-phase agent 22 that are demanded by one or more other training-phase agents 22 that are downstream of the training-phase agent 22 in the training supply chain graph 50.

In some examples, the training forecast states 24 included in the training data 20 may be collected from a plurality of real-world agents included in a real-world supply chain. However, in other examples, the amount of training data 20 received from real-world agents may be insufficient to train an accurate reinforcement learning simulation. In such examples, the processor 12 may be configured to programmatically generate at least a portion of the plurality of training forecast states 24. For example, the processor 12 may be configured to generate at least a portion of the plurality of training forecast states 24 using a Kalman filter, an autoregressive integrated moving average (ARIMA) model, an autoregressive moving average with exogenous variables (ARMAX) model, or some other forecasting method.

Figure 4:
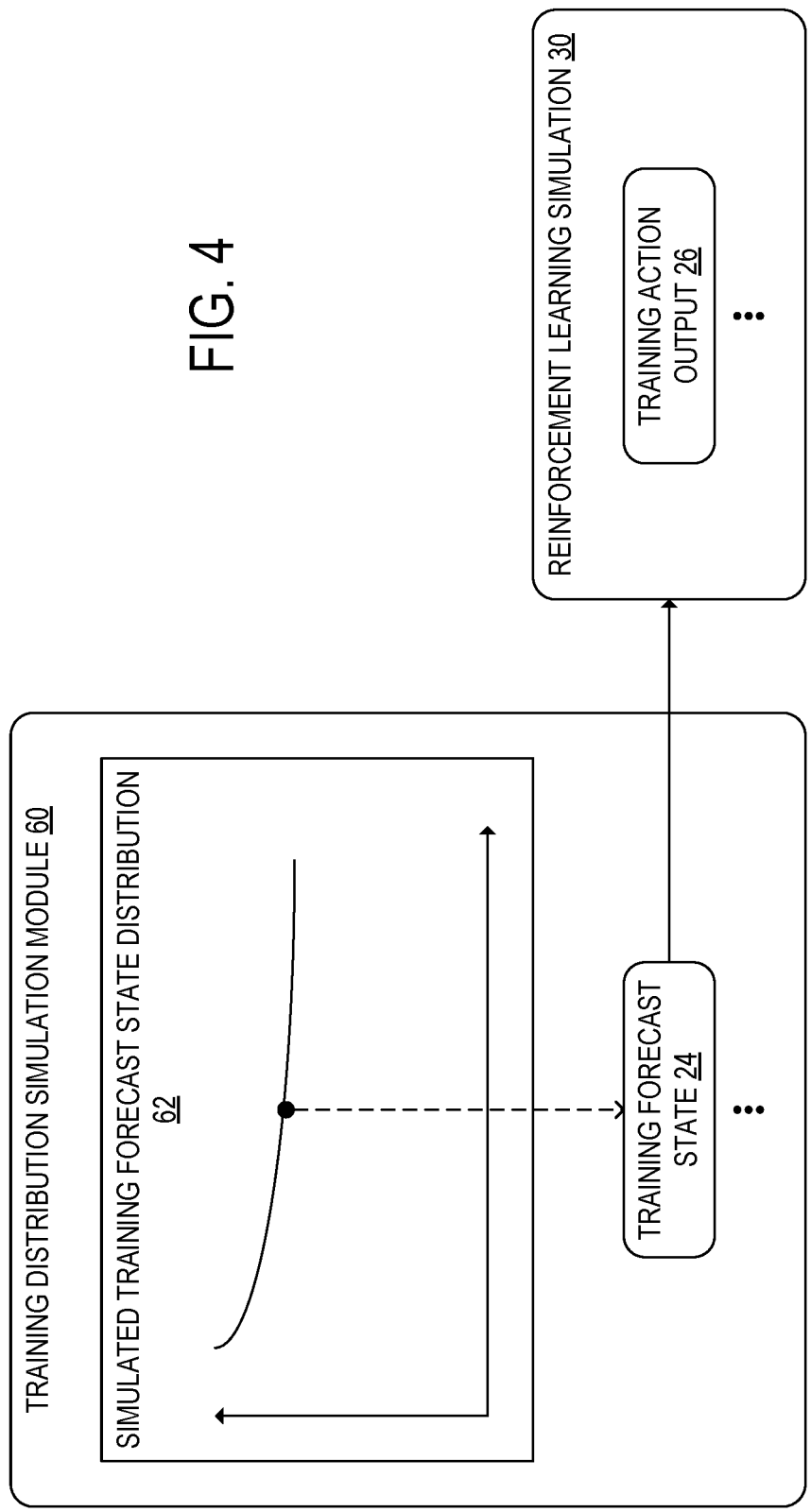
FIG. 4 schematically shows a training distribution simulation module at which one or more training forecast states included in the training data of the reinforcement learning simulation may be generated, according to the example of FIG. 1.

In some examples, as shown in FIG. 4, the processor 12 may be configured to generate at least a portion of the plurality of training forecast states 24 at least in part by sampling the portion of the plurality of training forecast states 24 from a simulated training forecast state distribution 62. The processor 12 may be configured to generate the simulated training forecast state distribution 62 at a training distribution simulation module 60. As depicted in the example of FIG. 4, the plurality of training forecast states 24 may be sampled from a continuous forecast state space over which the processor 12 is configured to generate the simulated training forecast state distribution 62. In some examples, the processor 12 may be configured to generate the simulated training forecast state distribution 62 at least in part by performing regression on empirical training forecast states 24 collected from real-world agents included in a real-world supply chain. Thus, the processor 12 may be configured to generate additional training data for the reinforcement learning simulation 30 that may allow for sufficient training of the reinforcement learning simulation 30 when the amount of real-world training data is small.

Returning to the example of FIG. 1, each training-phase agent 22 may have a respective reward function 28. The plurality of training-phase agents 22 included in the training supply chain graph 50 may have a plurality of respective reward functions 28 that are neither fully correlated nor fully anticorrelated with each other. Thus, in game-theoretic terms, the interaction of the training-phase agents 22 included in the training supply chain graph 50 may be a mixed-motive game rather than a fully cooperative game or a zero-sum game. The plurality of training-phase agents 22 may, for example, have respective reward functions 28 according to which the training-phase agents 22 are rewarded for maximizing their own profits. In other examples, other terms may be included in the reward functions 28 of the training-phase agents 22.

In some examples, the processor 12 may be configured to simulate the training supply chain graph 50 as a Markov decision process (MDP) during the training phase. In such examples, the interaction between the plurality of training-phase agents 22 may be modeled as a stochastic game in which N training-phase agents 22 have respective reward functions $\{f_1, \ldots, f_N\}$. The actions of a player with an index i may be given by a compact set $A_i \subset \mathbb{R}^{m_i}$, and the states of the player i may be given by a compact set $S_i \subset \mathbb{R}^{n_i}$. At each training timestep 58, the player i's objective may be a function $f_i(s_i(t), a_i(t); s_{-i}(t), a_{-i}(t))$ of a current joint-state action, where $s_i(t)$ is the state of the player i at the current timestep t, $a_i(t)$ is the action taken by the player i at the current timestep t, $s_{-i}(t)$ are the states of the players other than i at the current timestep t, and $a_{-i}(t)$ are the actions taken by the players other than i at the current timestep t. Each player is modeled as maximizing an infinite-horizon discounted reward with a discount factor given by $\gamma_i \in [0, 1)$. Thus, the reward for the player i is given by $$\sum_{t=0}^{\infty} E(\gamma_i^t f_i(s_i(t), a_i(t); s_{-i}(t), a_{-i}(t)))$$

where E indicates expected value.

In the MDP model, the states $s_i$ of the players may evolve dynamically as given by $$s_i(t+1) = g_i(s_i(t), a_i(t); a_{-i}(t), \epsilon_i(t))$$

over the plurality of training timesteps 58. In the above equation, each $g_i$ is a random variable. The probability of the player i transitioning from the state $s_i \in S_i$ to the state $s'_i \in S_i$ when the player i takes the action $a_i$ may be denoted as $g_i(s'_i | s_i, a)$. The player i may be assumed to have a stationary policy that is a function of its own state $s_i$. The stationary policy may output a probability distribution over the action space $A_i$ that is expressed as $$\pi_i: S \mapsto \Delta(A_i)$$

The probability of the player i taking the action $a_i \in A_i$ at the state s may be expressed as $\pi(a_i | s)$.

The state-action value function for the player i may be defined as follows:

$$V_i(s;\pi) = \int_{a_i \in A_i} ((1-\gamma_i) f_i(s_i, a_i; s_{-i}, a_{-i}) + \gamma_i \int_{s' \in S} V_i(s';\pi) g(ds'|s,a)) \pi(da|s)$$

In the above equation, the state space and the action space are continuous. s is the joint set of states for all the players, s' is the joint set of states to which the players transition, a is the joint set of actions, and $\pi$ is the joint policy for all the players. The joint policy $\pi$ is a stationary Markov equilibrium if each player's value function satisfies the following equation:

$$V_i(s;\pi) = \sup_{a_i \in A_i} \int_{a_{-i} \in A_{-i}} ((1-\gamma_i) f_i(s,a) + \gamma_i \int_{s' \in S} V_i(s';\pi) g(ds'|s,a)) \pi_{-i}(da_{-i}|ds)$$

When market supply and demand functions are weakly continuous and the state-action spaces are compact, there exists at least one Markov equilibrium. However, solving for the Markov equilibrium in the general case is NP-hard. Accordingly, the processor 12 may be configured to estimate the Markov equilibrium as discussed in further detail below.

In order to introduce the multiplayer MDP model used to simulate the supply chain and estimate the Markov equilibrium, a single-player MDP model of a supply chain is discussed herein. In the single-player MDP model, a training-phase agent 22 (the player) interacts directly with the market supply node 52 and the market demand node 54. The unit price at which the training-phase agent 22 sells a product to the market demand node 54 may be expressed as $x_0$ and the number of units of a raw material the training-phase agent 22 purchases from the market supply node 52 may be expressed as $x_1$. The cost of a unit of the raw material purchased from the market supply node 52 at a timestep t may be expressed as $P(x_1, t)$, and the quantity of the product demanded by the market demand node 54 at the timestep t may be expressed as $Q(x_0, t)$. At each timestep t, the player selects values of $x_0$ and $x_1$. Thus, as discussed in further detail below, $x_0$ and $x_1$ may be training action outputs 26 of the reinforcement learning simulation 30 that are generated during the training phase based at least in part on the training forecast states 24.

The profit of the training-phase agent 22 may be expressed as $f(x_0, x_1)$. In the single-player MDP model, the total amount of the product sold by the player may be given by $\min\{Q(x_0(t)), x_1(t)\}$. In addition, the total profit of the training-phase agent 22 may be given by $$\sum_{t=0}^{\infty} \gamma^t E\left(\min\{Q(x_0(t)), x_1(t)\} x_0(t) - P(x_1(t)) x_1(t) - \beta(x_0(t)^2 + x_1(t)^2)\right)$$

In the above equation, $\beta$ is a coefficient of a quadratic regularization term that reflects economies of scale for the training-phase agent 22.

In the single-player MDP model, the training-phase agent 22 may be configured to forecast the raw material unit price P and the market demand Q at the current timestep t as follows:

$$\hat{p}(t) = g_p(\hat{p}(t-1), P(x_1(t-1)), x_0, x_1)$$

$$\hat{q}(t) = g_q(\hat{q}(t-1), Q(x_0(t-1)), x_0, x_1)$$

The training forecast state 24 for the training-phase agent 22 may accordingly include the raw material price forecast $\hat{p}(t)$ and the market demand forecast $\hat{q}(t)$. In some examples, the raw material price forecast $\hat{p}(t)$ may additionally or alternatively depend upon one or more additional quantities, such as the values of $\hat{p}$ and/or P at one or more additional timesteps before the immediately prior timestep t−1. Similarly, the market demand forecast $\hat{q}(t)$ may additionally or alternatively depend upon one or more additional quantities, such as the values of $\hat{q}$ and/or Q at the one or more additional timesteps.

The forecasts $\hat{p}(t)$ and $\hat{q}(t)$ may be generated via any of a variety of methods such as a Kalman filter, an ARIMA model, or an ARMAX model, as discussed above. For example, when a (1, 0, 1) ARMAX model is used, the forecasts $\hat{p}(t)$ and $\hat{q}(t)$ may be expressed as follows:

$$\hat{p}(t) = \alpha_0 + \alpha_1 \hat{p}(t-1) + \alpha_2 x_1(t-1) + \alpha_3 \epsilon_p(t-1)$$

$$\hat{q}(t) = \beta_0 + \beta_1 \hat{q}(t-1) + \beta_2 x_0(t-1) + \beta_3 \epsilon_q(t-1)$$

In the above equations, $\alpha_i$ are the parameters of the ARMAX model of P, $\beta_i$ are the parameters of the ARMAX model of Q, and $\epsilon_p$ and $\epsilon_q$ are normally-distributed error terms of $\hat{p}(t)$ and $\hat{q}(t)$ respectively.

Using the definitions discussed above, the states, actions, reward, transition dynamics, and policy for the single-player MDP model may be given as follows:

States: the raw material price forecast and the market demand forecast, expressed as $\hat{q}, \hat{p} \in \mathbb{R}_+$.

Actions: the sale price of the unit product and the quantity of raw material purchased, expressed as $x_0, x_1 \in \mathbb{R}_+$.

Reward: the net profit earned by the player in the discounted infinite horizon setting.

Transition dynamics: the forecasting methods utilized by the player to generate $\hat{p}(t)$ and $\hat{q}(t)$.

Policy: the player's pricing and ordering strategies are stationary probability distributions that depend upon the current forecast: $\pi: \mathbb{R}_+^2 \mapsto \Delta(\mathbb{R}_+^2)$, such that $[x_0, x_1] \sim \pi(\hat{p}, \hat{q})$.

The single-player MDP model of the supply chain may be extended to a multiplayer MDP model in which a plurality of training-phase agents 22 are included in the training supply chain graph 50, as discussed above and illustrated in FIG. 2. The training supply chain graph 50 may be expressed as $$G=(V \cup \{s,d\},E)$$

where each node $v \in V$ corresponds to a training-phase agent 22 and each directed edge $(i, j) \in E$ indicates that a player i sells to a player j. The nodes s and d correspond to the market supply node 52 and the market demand node 54, respectively. Each player v may have decision variables $x_0(v)$, the price at which the player v sells its product, and $x_i(v), i \in N_I(v)$, the quantity of a raw material bought from an ith incoming neighbor of the player v. At each timestep t, the player v's total profit may be given by $$f_v(x_0(t), x_1(t), \ldots, x_K(t)) =$$
$$E(Q_f(v; t)x_0(v; t)) - \sum_{i=N_I(v)} x_0(i; t)x_1(v; t) - \beta\left(x_0(v; t)^2 + \sum_{i=N_I(v)} x_i(v; t)^2\right)$$

In the above equation, $Q_f$ is the total quantity of the product sold by the player v. $Q_f$ is given by $$Q_f(v; t) = \min\left\{\sum_{i=N_I(v)} x_i(v; t), \sum_{i=N_O(v)} x_v(i; t)\right\}$$

At the market supply node 52 in the multiplayer MDP model, the total quantity of raw material demanded by the supply chain may determine the unit cost, which may be expressed as follows:

$$x_0(s) = P\left(\sum_{v \in N_O(s)} x_s(v)\right)$$

At the market demand node, the demand for each player's product may be determined by the player-specific price at which that player sells the product. The demand for each player's product may be expressed as follows:

$$x_v(d)=Q(x_0(v))$$

The players in the multiplayer MDP model make local forecasts to select actions $x_0, \ldots, x_i(v)$ for $i \in N_I(v)$. The player v's quantity forecast at time t may be denoted $\hat{q}(t; v)$. The quantity forecast at time t may be expressed as $\hat{q}(t)$ for all $v \in V$. In addition, the player v's forecast of player i's price at time t may be expressed as $\hat{p}(t; v, i)$. The price forecast at time t may be expressed as $\hat{p}(t)$ for all $(v, i) \in V \times V$. The stationary policy for the player v may be expressed as $\pi_v(\bullet; v)$. The joint strategy may be denoted as $\pi=(\pi_1, \ldots, \pi_v)$ or as $\pi=(\pi_v, \pi_{-v})$, where $\pi_{-v}$ denotes the policies of the players other than v.

Returning to the example of FIG. 1, the processor 12 may be further configured to train the reinforcement learning simulation 30 of the training supply chain graph 50 using the training data 20 via policy gradient reinforcement learning. The reinforcement learning simulation 30 may, for example, be trained via actor-critic reinforcement learning using a technique such as the deep deterministic policy gradient (DDPG) approach. The DDPG approach utilizes an actor network 32 configured to estimate a policy of the reinforcement learning simulation 30 and a critic network 42 configured to estimate a Q-value of the reinforcement learning simulation 30. The actor network 32 and the critic network 42 may be indicated as $\mu(\bullet; \theta_a)$ and $Q(\bullet, \bullet; \theta_c)$, respectively, where $\theta_a$ are actor network weights and $\theta_c$ are critic network weights. The actor network 32 may have an actor network objective function $J(\theta_a)$ given by $$J(\theta_a) = \max_{s \sim \rho, a \sim \mu(\cdot;\theta_a)} [R(s, a)] = \max_{s \sim \rho, a \sim \mu(\cdot;\theta_a)} [Q(s, a; \theta_c)]$$

In the above equation, $\sim$ denotes "sampled from the distribution" and $\rho$ is the initial probability distribution of the training forecast state 24.

At the actor network 32, the processor 12 may be configured to generate a plurality of training action outputs 26 respectively associated with the training-phase agents 22, as shown in the example of FIG. 3. The training action output 26 for a training-phase agent 22 may include one or more training upstream purchase quantities 26A of goods received from one or more corresponding training-phase agents 22 that are upstream of the training-phase agent 22 in the training supply chain graph 50. The training action output 26 for the training-phase agent 22 may further include one or more training downstream sale prices 26B of goods sold by the training-phase agent 22 to one or more other training-phase agents 22 that are downstream of the training-phase agent 22 in the training supply chain graph 50. Thus, the plurality of training action outputs 26 may include the decision variables $x_0(v)$ and $x_i(v)$ for each player v.

Returning to FIG. 1, the critic network 42 may be configured to receive, as input, a one-step state-action-reward sequence given by $(s, a)$ and output a prediction of a highest-reward Q-value $Q(s, a)$ for that state-action-reward sequence. The critic network 42 may have a critic network loss function $L(\theta_c)$ given by $$L(\theta_c) = E_{s,a,r,s^+ \sim D}\left[Q(s, a; \theta_c) - R(s, a) + \gamma \max_{a'} Q(s', a'; \theta_c)\right]$$

In the above equation, D is the set of state transitions. The critic network loss function $L(\theta_c)$ provided in the above equation is a least-squares loss function.

At the processor 12, the critic network may be used to compute an estimated actor network gradient 46 of the actor network 32 as follows:

$$\nabla_{\theta_a} J(\theta_a) s \sim D[\nabla_{\theta} Q(s, \mu(s; \theta_a); \theta_c)] = E_{s \sim D}[\nabla_{\theta} \mu_\theta(s; \theta_a) \nabla_a Q(s, \mu(s; \theta_a); \theta_c)]$$

The processor 12 may be configured to iteratively update the actor network 32 and the critic network 42 via gradient descent utilizing the estimated actor network gradient 46. Thus, the actor network weights $\theta_a$ may converge toward optimal actor network weights $\theta^*_a$ and the actor network 32 may converge toward an optimal actor network given by (s; $\theta^*_a$), $\forall_S \in S$.

The multiplayer MDP model may be extended to scenarios in which the players have access to further observations w in addition to their own individual states and actions ($s_i$, $a_i$). When the players have access to the additional observations w, the objective function $J(\theta_a)$ of the actor network 32 is given as follows:

$$J(\theta_a) = \max_{s \sim \rho, a \sim \mu(\cdot;\theta_a(i))} [R(s_i, a_i, w)] = \max_{s \sim \rho, a \sim \mu(\cdot;\theta_a(i))} [Q(s_i, a_i, w; \theta_c(i))]$$

Similarly, when the Q-value function takes the additional observations $w_i$ for a player i as input as well as the state-action observations ($s_i$, $a_i$), the least-squares loss function $L(\theta_c)$ of the critic network 42 may be given by $$L(\theta_c) =$$
$$E_{s,a,r,s^+ \sim D}\left[Q(s_i, a_i, w_i; \theta_c(i)) - R(s_i, a_i, w_i) + \gamma \max_{a'} Q(s'_i, a'_i, w_i; \theta_c(i))\right]$$

The further observations $w_i$ for each player i in the supply chain may, for example, be one of the following:

$w_i = \emptyset$: the players have no access to additional observations. The reinforcement learning simulation 30 is equivalent to a respective plurality of reinforcement learning models for the individual training-phase agents 22 that are concurrently trained with a shared environment.

$w_i = s_{-i}$: each player observes states of all players.

$w_i = a_{-i}$: each player observes actions of all players.

$w_i = s_{-i}, a_{-i}$: each player observes the state-actions of all players.

$w_i = \{s_j | j \in N(i)\}$: each player observes the states of neighboring players.

$w_i = \{s_j, a_j | j \in N(i)\}$: each player observes the states and actions of neighboring players.

In the example of FIG. 1, the processor 12 may be configured to set the additional observations $w_i$ such that at each training timestep 58 of the plurality of training timesteps 58, the plurality of training forecast states 24 are shared between the plurality of training-phase agents 22 during training of the reinforcement learning simulation 30. Thus, in such examples, the processor 12 may be configured to set $w_i = s_{-i}$.

Figure 5:
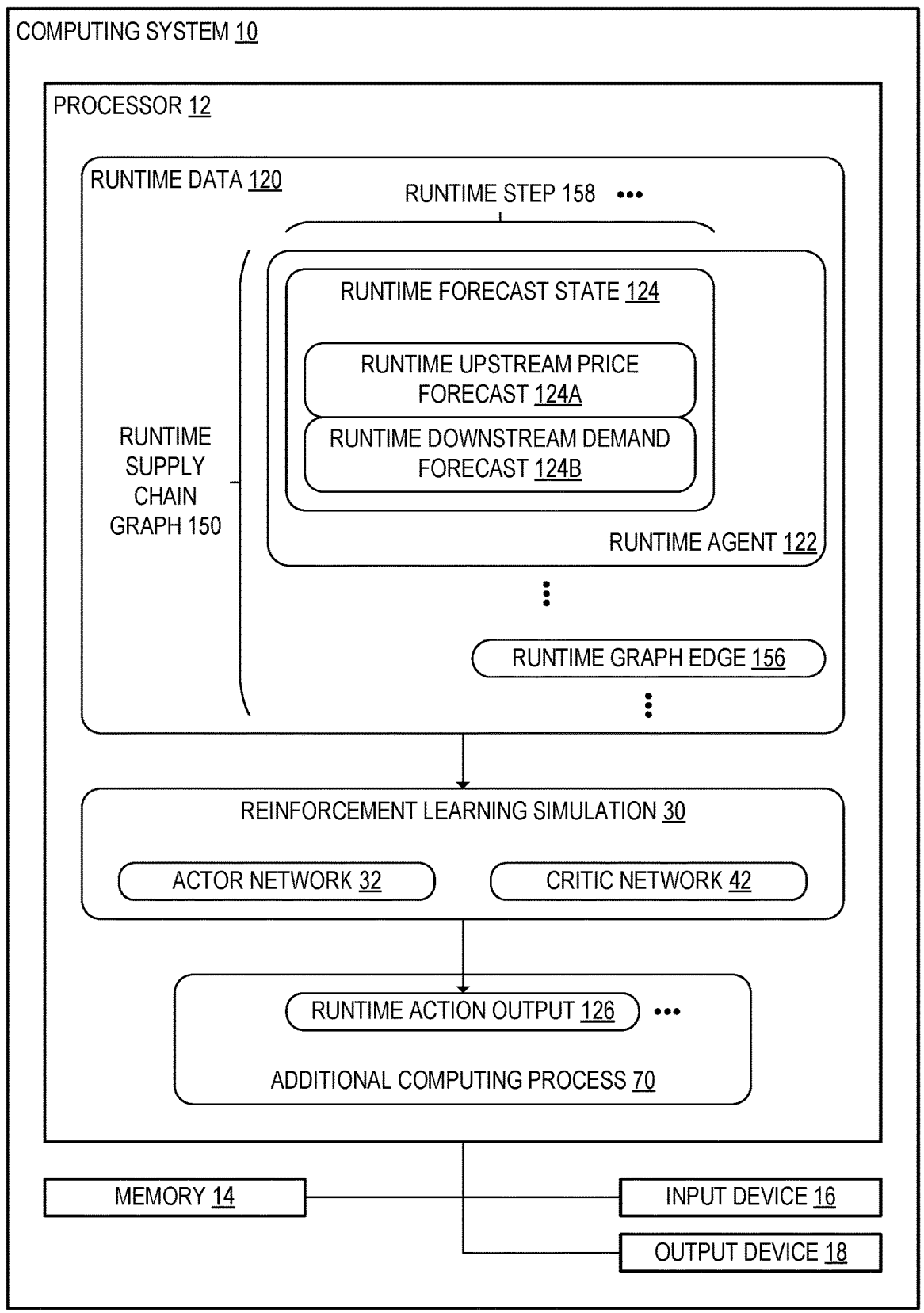
FIG. 5 schematically shows the computing device during an inferencing phase in which the processor is configured to simulate a plurality of runtime agents at the trained reinforcement learning simulation, according to the example of FIG. 1.

FIG. 5 shows the computing system 10 during an inferencing phase in which the processor 12 is configured to simulate a plurality of runtime agents 122 at the trained reinforcement learning simulation 30. The inferencing phase may be performed subsequently to the training phase. During the inferencing phase, the processor 12 may be further configured to receive runtime data 120. The runtime data 120 may include a plurality of runtime forecast states 124 associated with a respective plurality of runtime agents 122 included in a runtime supply chain graph 150. Each runtime forecast state 124 may include one or more respective runtime upstream price forecasts 124A and one or more respective runtime downstream demand forecasts 124B.

The runtime supply chain graph 150 may include a plurality of runtime agents 122 connected by a plurality of runtime graph edges 156. The processor 12 may be configured to receive runtime forecast states 124 for a runtime agent 122 for a respective plurality of runtime steps 158. In some examples, the processor 12 may receive respective runtime forecast states 124 from each of the runtime agents 122 in the runtime supply chain graph 150 at each runtime step 158. In other examples, the processor 12 may receive runtime forecast states 124 from one or more of the runtime agents 122 at only a subset of the plurality of runtime steps 158 included in the inferencing phase.

During the inferencing phase, for a runtime agent 122 of the plurality of runtime agents 122, the processor 12 may be further configured to generate a respective runtime action output 126 at the trained reinforcement learning simulation 30. The runtime action output 126 may be associated with the corresponding runtime forecast state 124 of the runtime agent 122 and may be generated for the current runtime step 158. The runtime output action 126 may, for example, include a price at which the runtime agent 122 sells a product to one or more other runtime agents 122 that are downstream of the runtime agent 122 in the runtime supply chain graph 150. In some examples, the runtime action output 126 may include a plurality of prices at which the runtime agent 122 sells a plurality of respective products. The runtime action output 126 may further include one or more quantities of raw materials purchased from one or more respective runtime agents 122 that are upstream of the runtime agent 122 in the runtime supply chain graph 150.

The runtime output action 126 for the runtime agent 122 may be generated based at least in part on the respective plurality of runtime forecast states 124 of each of the runtime agents 122 from which the processor 12 receives a runtime forecast state 124. The plurality of runtime forecast states 124 may accordingly be pooled at the reinforcement learning simulation 30 when the processor 12 generates the runtime output action 126. In such examples, $w_i = s_{-i}$ in both the training phase and the inferencing phase. Pooling the agents' states during the inferencing phase as well as during the training phase may allow the runtime agents 122 to achieve higher and more stable rewards. Since the runtime forecast states 124 are pooled at the reinforcement learning simulation 30 in such examples rather than being shared between the runtime agents 122 directly, the runtime agents 122 may protect their proprietary data from each other while also obtaining the lift in reward and reward stability that may result from sharing the runtime forecast states 124.

Subsequently to generating the plurality of runtime action outputs 126, the processor 12 may be further configured to output the runtime action output 126 associated with the runtime agent 122. The processor 12 may be configured to output the runtime action output 126 to one or more additional computing processes 70. For example, as discussed in further detail below, the processor 12 may be configured to output the runtime action output 126 for display in a graphical user interface (GUI). Additionally or alternatively, the processor 12 may be configured to store the runtime action output 126 in the memory 14.

Figure 6:
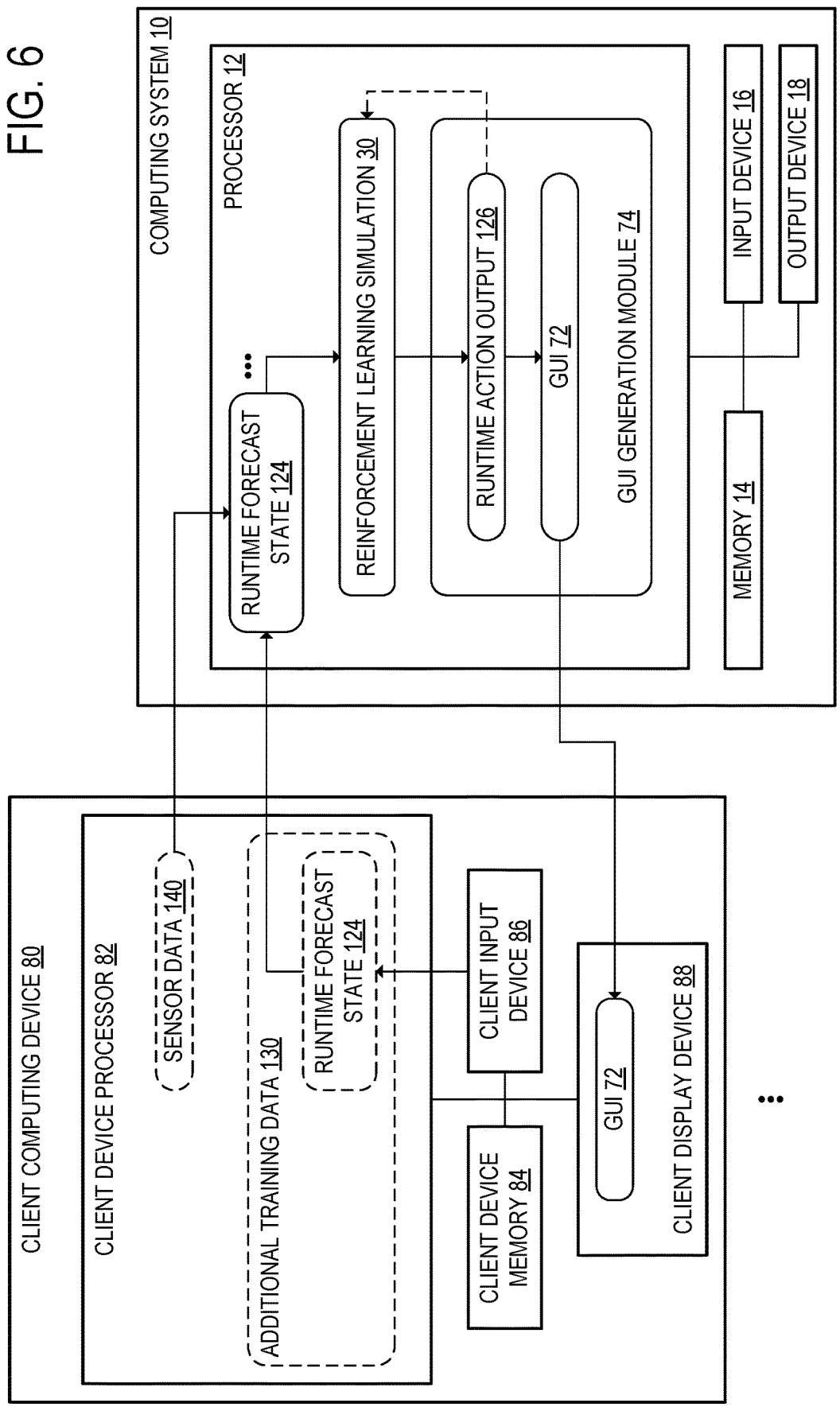
FIG. 6 schematically shows the computing system when a plurality of runtime forecast states are received from a respective plurality of client computing devices, according to the example of FIG. 1.

In some examples, as depicted in the example of FIG. 6, the processor 12 may be configured to receive the plurality of runtime forecast states 124 from one or more client computing devices 80. The example client computing device 80, as depicted schematically in FIG. 6, may include a client device processor 82, client device memory 84, one or more client input devices 86, and a client display device 88. The client computing device 80 may include one or more other types of output device in some examples. In the example of FIG. 6, the plurality of runtime forecast states 124 are received from a plurality of respective client computing devices 80, which may, for example, be utilized by a corresponding plurality of users affiliated with different runtime agents 122 in the runtime supply chain graph 150.

Subsequently to receiving the plurality of runtime forecast states 124 from the one or more client computing devices 80, the processor 12 may be further configured to compute one or more runtime action outputs 126 at the reinforcement learning simulation 30 by using the plurality of runtime forecast states 124 as inputs. The processor 12 may be further configured to output at least one runtime action output 126 to a client computing device 80 from which a corresponding runtime forecast state 124 was received. When the processor 12 outputs the at least one runtime action output 126, the processor 12 may be configured to generate a GUI 72 that indicates the runtime action output 126. The processor 12 may be further configured to transmit the GUI 72 for display at a client computing device 80 of the one or more client computing devices 80. As shown in the example of FIG. 6, the client computing device 80 that receives the GUI 72 may display the GUI 72 on the client display device 88. The client computing device 80 to which the processor 12 transmits the GUI 72 may be the client computing device 80 from which the processor 12 received the corresponding runtime forecast state 124.

The processor 12 may, in some examples, be configured to receive sensor data 140 from the one or more client computing devices 80 and generate the one or more runtime forecast states 124 based at least in part on the sensor data 140, as depicted in the example of FIG. 6. According to one example use case scenario, the client computing device 80 at which the GUI 72 is configured to be displayed may be included in an agricultural Internet-of-Things (IoT) sensor system, and the sensor data 140 may be agricultural IoT sensor data. The processor 12 of the computing system 10 may be further configured to receive the agricultural IoT sensor data from the client computing device 80 and to compute at least one runtime forecast state 124 of the plurality of runtime forecast states 124 based at least in part on the agricultural IoT sensor data. The processor 12 may be further configured to generate a runtime action output 126 for the client computing device 80 based at least in part on the generated runtime forecast state 124 and at least one other runtime forecast state 124. The processor 12 may be further configured to generate a GUI 72 indicating the runtime forecast state 124 and transmit the GUI 72 to the client computing device 80 for display at the client display device 88.

Figure 7:
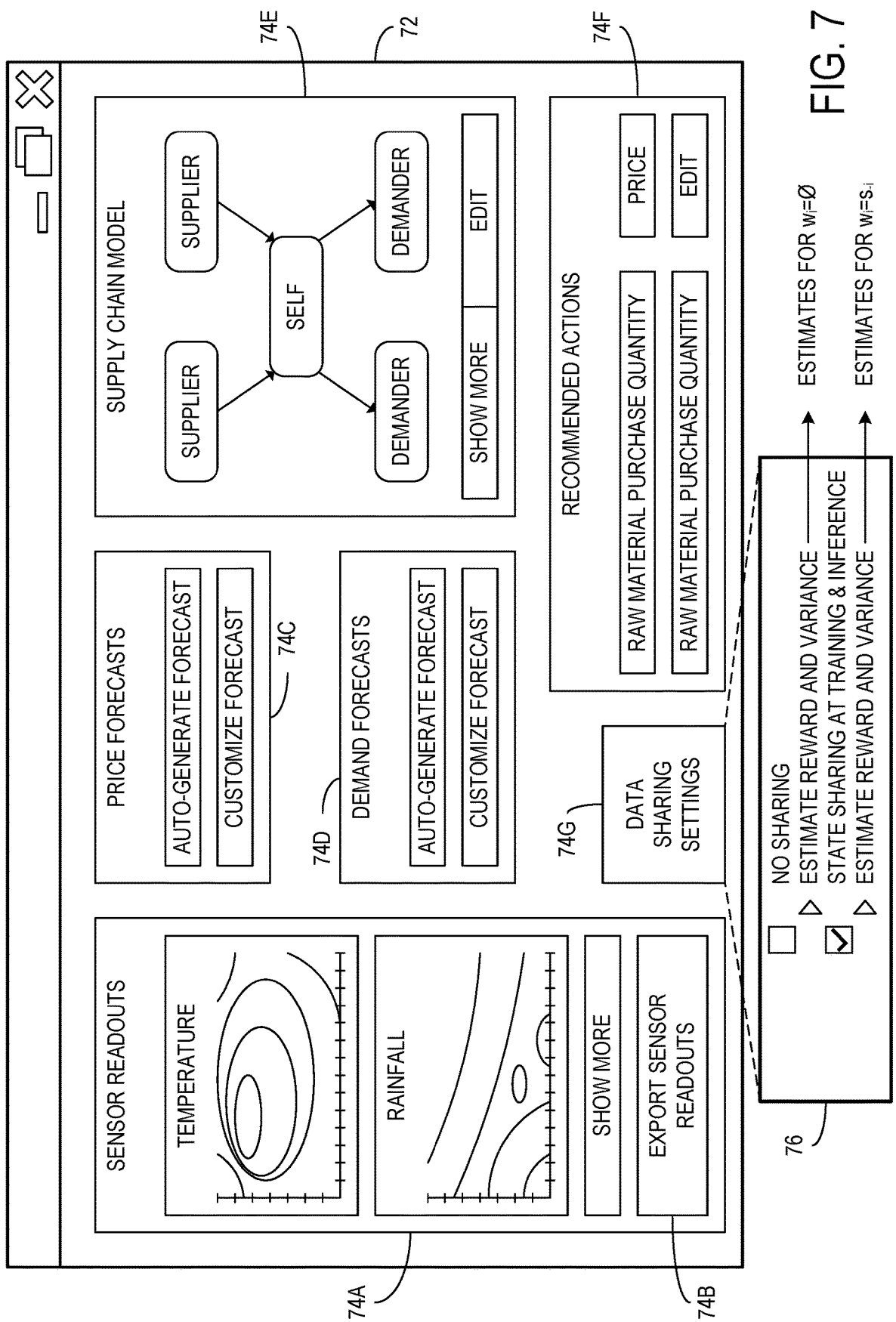
FIG. 7 shows an example graphical user interface (GUI) configured to be transmitted from the computing system to a client computing device for display at a client display device, according to the example of FIG. 1.

FIG. 7 shows an example GUI 72 that may be transmitted for display at the client computing device 80 in examples in which the client computing device 80 is included in an agricultural IoT sensor system. In the example of FIG. 7, the GUI includes a sensor readout interface element 74A in which the agricultural IoT sensor data is displayed. The GUI 72 may further include a sensor readout export interface element 74B via which the user may interact to export the agricultural IoT sensor data to the computing system 10.

The GUI 72 may further include a price forecast interface element 74C and a demand forecast interface element 74D via which the user may enter the one or more runtime upstream price forecasts 124A and the one or more runtime downstream demand forecasts 124B. In some examples, the user may, at the price forecast interface element 74C, instruct the processor 12 to programmatically generate the one or more runtime upstream price forecasts 124A. The one or more runtime upstream price forecasts 124A may be generated based at least in part on the agricultural IoT sensor data. In addition, the user may interact with the price forecast interface element 74C to specify the one or more runtime upstream price forecasts 124A. When the user specifies the one or more runtime upstream price forecasts 124A, the user may enter the one or more runtime upstream price forecasts 124A at the GUI 72 or may modify one or more programmatically generated values of the one or more runtime upstream price forecasts 124A. Similarly, at the demand forecast interface element 74D, the user may instruct the processor 12 to programmatically generate the one or more runtime downstream demand forecasts 124B. The one or more runtime downstream demand forecasts 124B may be generated based at least in part on the agricultural IoT sensor data. In addition, the user may interact with the demand forecast interface element 74D to specify the one or more runtime downstream demand forecasts 124B. When the user specifies the one or more runtime downstream demand forecasts 124B, the user may enter the one or more runtime downstream demand forecasts 124B at the GUI 72 or may modify one or more programmatically generated values of the one or more runtime downstream demand forecasts 124B.

As depicted in the example of FIG. 7, the GUI 72 may further include a supply chain model interface element 74E. At the supply chain model interface element 74E, the user may interact with the GUI 72 to specify at least a portion of the runtime supply chain graph 150. For example, the user may specify one or more suppliers to raw materials to the runtime agent 122 that corresponds to the user and may further specify one or more demanders of a product sold by that runtime agent 122. At the processor 12, supply chain data specified by a plurality of users at respective supply chain model interface elements 74E may be combined to form the runtime supply chain graph 150.

The GUI 72 may further include a runtime action output interface element 74F at which the one or more runtime action outputs 126 generated at the trained reinforcement learning simulation 30 for the runtime agent 122 may be displayed to the user as recommended actions. The one or more runtime action outputs 126 may include recommendations of one or more raw material purchase quantities for the runtime agent 122 to purchase from one or more respective upstream runtime agents 122. The one or more runtime action outputs 126 may further include a price per unit product for the runtime agent 122 to charge one or more downstream runtime agents 122. In addition, at the runtime action output interface element 74F, the user may edit the one or more runtime action outputs 126 to reflect an actual amount of at least one raw material purchased from an upstream runtime agent 122 and/or a price charged to downstream runtime agents 122.

The GUI 72 may further include a data sharing settings interface element 74G. As shown in the example of FIG. 7, when the user selects the data sharing settings interface element 74G, the processor 12 may be further configured to display a sharing settings window 76 at the GUI 72. The sharing settings window 76 may include respective interface elements that, when selected, may activate and deactivate sharing of the runtime upstream forecast states 124 with the reinforcement learning simulation 30. When sharing of the runtime upstream forecast states 124 is active, the runtime forecast states 124 may be used to generate the runtime output actions 126. The runtime forecast states 124 may also be used to perform additional training at the reinforcement learning simulation 30, as discussed in further detail below.

The sharing settings window 76 may further include respective interface elements that may be selected by the user to display estimated rewards, and variance in those rewards, for corresponding information sharing settings. These rewards and variances may be estimated for the runtime agent 122 based on rewards estimated for previously simulated runtime agents 122 before the runtime agent 122 shares its runtime forecast states 124 with the reinforcement learning model 30. Thus, the user interacting with the GUI 72 may view an estimated change in reward that would occur if state sharing were activated or deactivated. For example, the GUI 72 may display an absolute number estimated for the reward or may alternatively display a percentage change in the reward. The estimated reward for an information sharing setting may be estimated, for example, by averaging the simulated rewards obtained by a plurality of other runtime agents 122 that have positions in the runtime supply chain 150 corresponding to that of the runtime agent 122 for which the GUI 72 is displayed. In such examples, the estimated rewards for the runtime agent 122 and the other runtime agents 122 may be normalized by the runtime agents' total quantities of raw materials purchased or products sold in order to account for differences in scale between different runtime agents 122. The variance in the rewards of the runtime agents 122 may also be estimated and displayed in the sharing settings window 76 in some examples. In such examples, the displayed variance may be computed based on the normalized rewards. Additionally or alternatively, the sharing settings window 76 may further include a confidence interval (e.g. a 90% confidence interval or a 95% confidence interval) for the estimated reward.

Returning to FIG. 6, in some examples, the processor 12 may be further configured to perform additional training at the trained reinforcement learning simulation 30. The additional training may be performed using one or more runtime forecast states 124 of the plurality of runtime forecast states 124 as additional training data 130. Thus, the processor 12 may be configured to continue training the trained reinforcement learning simulation 30 during runtime such that the reward obtained using the runtime action outputs 126 generated at the trained reinforcement learning simulation may continue to increase during runtime. The runtime supply chain graph 150 may be used as an additional training supply chain graph when the additional training is performed. The processor 12 may be configured to model the runtime supply chain graph 150 during the additional training as including a plurality of additional training-phase agents corresponding to the plurality of runtime agents 122. The one or more runtime forecast states 124 may be shared between the plurality of additional training-phase agents during the additional training, such that $w_i = s_{-i}$. Pooling the additional training data 130 during the additional training may allow the reinforcement learning simulation 30 to converge to higher and more stable rewards for the runtime agents 122.

Figure 8:
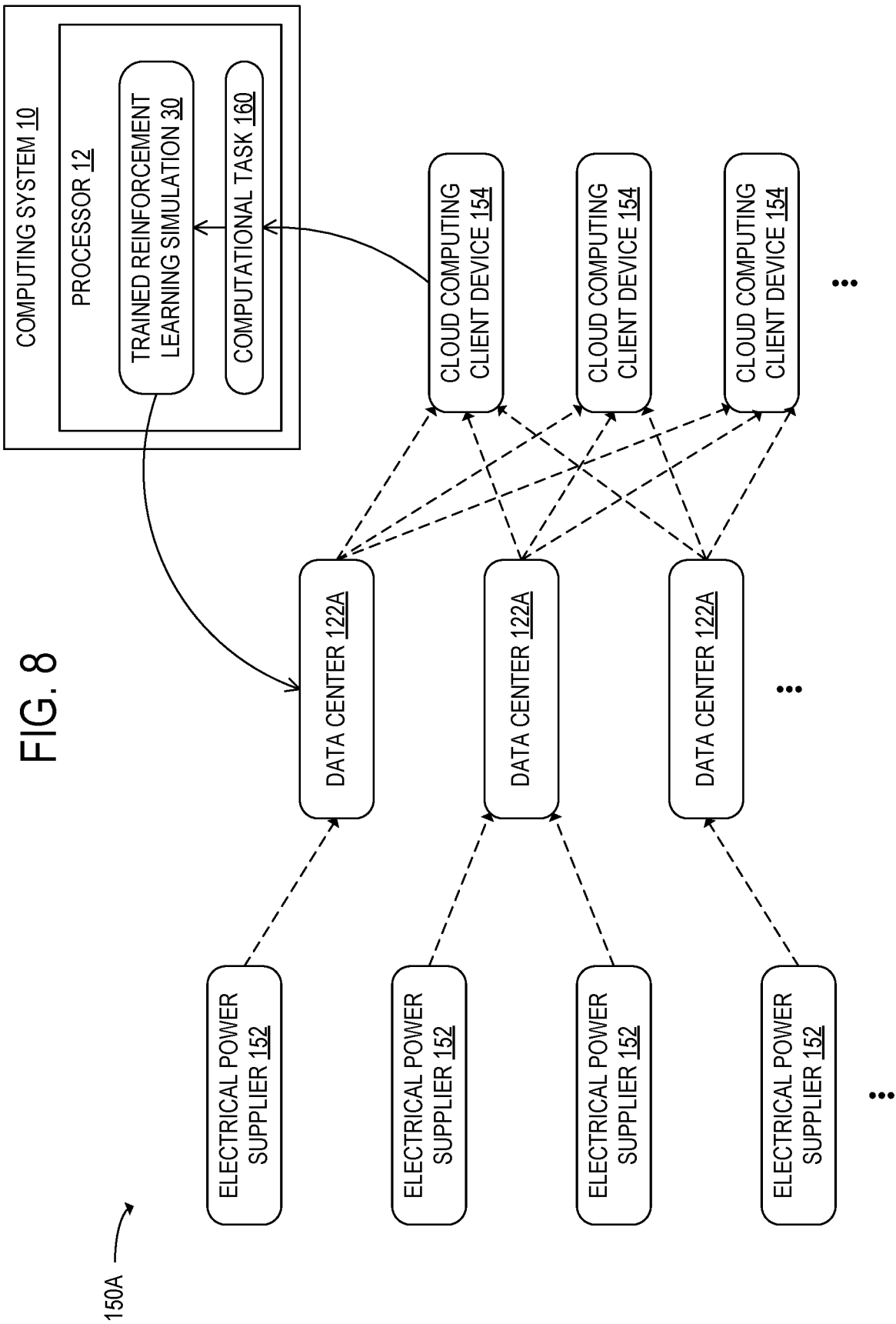
FIG. 8 shows an example runtime supply chain graph including a plurality of electrical power suppliers, a plurality of data centers, and a plurality of cloud computing client devices as runtime agents, according to the example of FIG. 1.

In another example use case scenario, the runtime supply chain graph 150 may represent electrical power supplied to a plurality of data centers. FIG. 8 shows an example runtime supply chain graph 150A including a plurality of electrical power suppliers 152, a plurality of data centers 122A, and a plurality of cloud computing client devices 154 as runtime agents 122. The processor 12 may be configured to receive a request from a cloud computing client device 154 to perform a computational task 160. In response to receiving the request from a cloud computing client device 154, the processor 12 may be configured to execute the trained reinforcement learning simulation 30. The processor 12 may be configured to determine, as the runtime action output 126 of the trained reinforcement learning simulation 30, one or more data centers 122A of the plurality of data centers 122A at which to execute the computational task 160. Thus, the processor 12 may be configured to allocate physical computing resources to the computational task 160 at least in part at the trained reinforcement learning simulation 30.

The processor 12 may be further configured to programmatically output instructions to execute the computational task 160 at the one or more data centers 122A. The trained reinforcement learning simulation 30 may, for example, assign the computational task 160 to the one or more data centers 122A such that a cost of electrical power consumption when executing the computational task 160 is reduced. In other examples, one or more other variables such as amounts of greenhouse gas emissions may be used as inputs of the reward functions 28 of the training-phase agents 22 during training of the reinforcement learning simulation 30 for use in cloud computing resource allocation.

Experimental results obtained using the systems discussed above are discussed below. The inventors have performed simulations of a training supply chain graph 50 under different information-sharing conditions during the training phase and the inferencing phase. These simulations were performed for an example training supply chain graph 50 including two training-phase agents 22. The training data 20 used in the simulation performed by the inventors was data from the California strawberry industry, and the two training-phase agents 22 represented a grower and a distributor. The estimated average cost per pound of growing strawberries was estimated to be $0.9038/lb. The demand curve was estimated via linear regression to be $$y = -35.701x + 141.7$$

$$r^2 = 0.4735$$

where y is demand in units of 10 million lbs. and x is retail price in dollars per pound. The players' forecasts were made using ARMAX with parameters (1, 0, 0) such that their fitted ARMAX models of $\hat{p}(t)$ and $\hat{q}(t)$ are given as follows:

$$\hat{p}(t) = 0.8\hat{p}(t-1) + 0.2x_1(t-1)$$

$$\hat{q}(t) = 0.8\hat{q}(t-1) + 0.2x_0(t-1)$$

During training of the reinforcement learning simulations 30 in the simulations performed by the inventors, the training-phase agents 22 were simulated for 15000 episodes of 40 epochs each. The training-phase agents 22 each had a discount factor of $\gamma_i = 0.99$ for $i = \{1, 2\}$.

The following information-sharing conditions were used in the simulations performed for the training supply chain graph 50 discussed above:
 $w_i = \emptyset$ during training and inferencing.
 $w_i = s_{-i}$ during training only.
 $w_i = s_{-i}$ during training and inferencing.
 $w_i = s_{-i}$, $a_{-i}$ during training and inferencing.

Figure 9A:
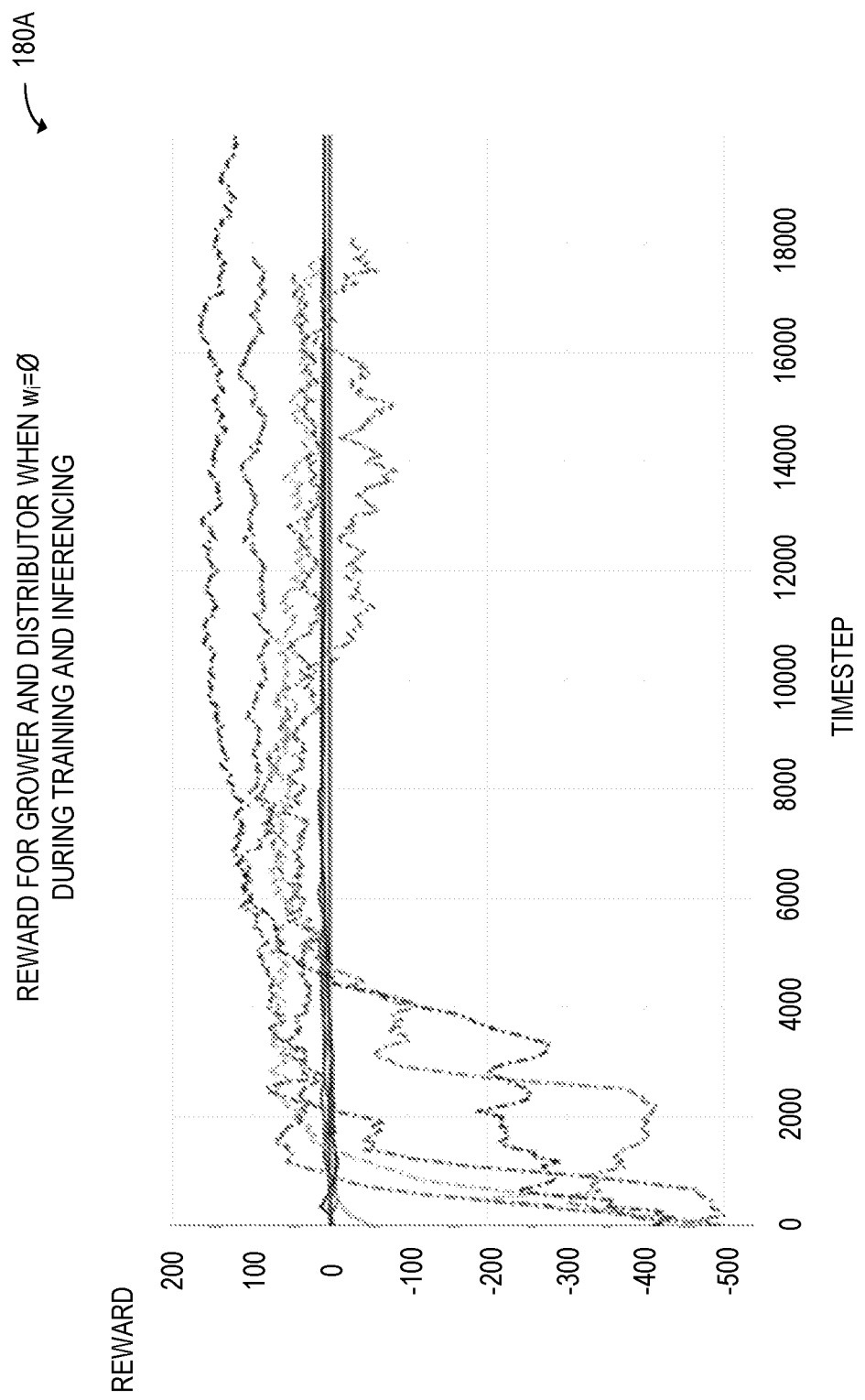
Figure 9B:
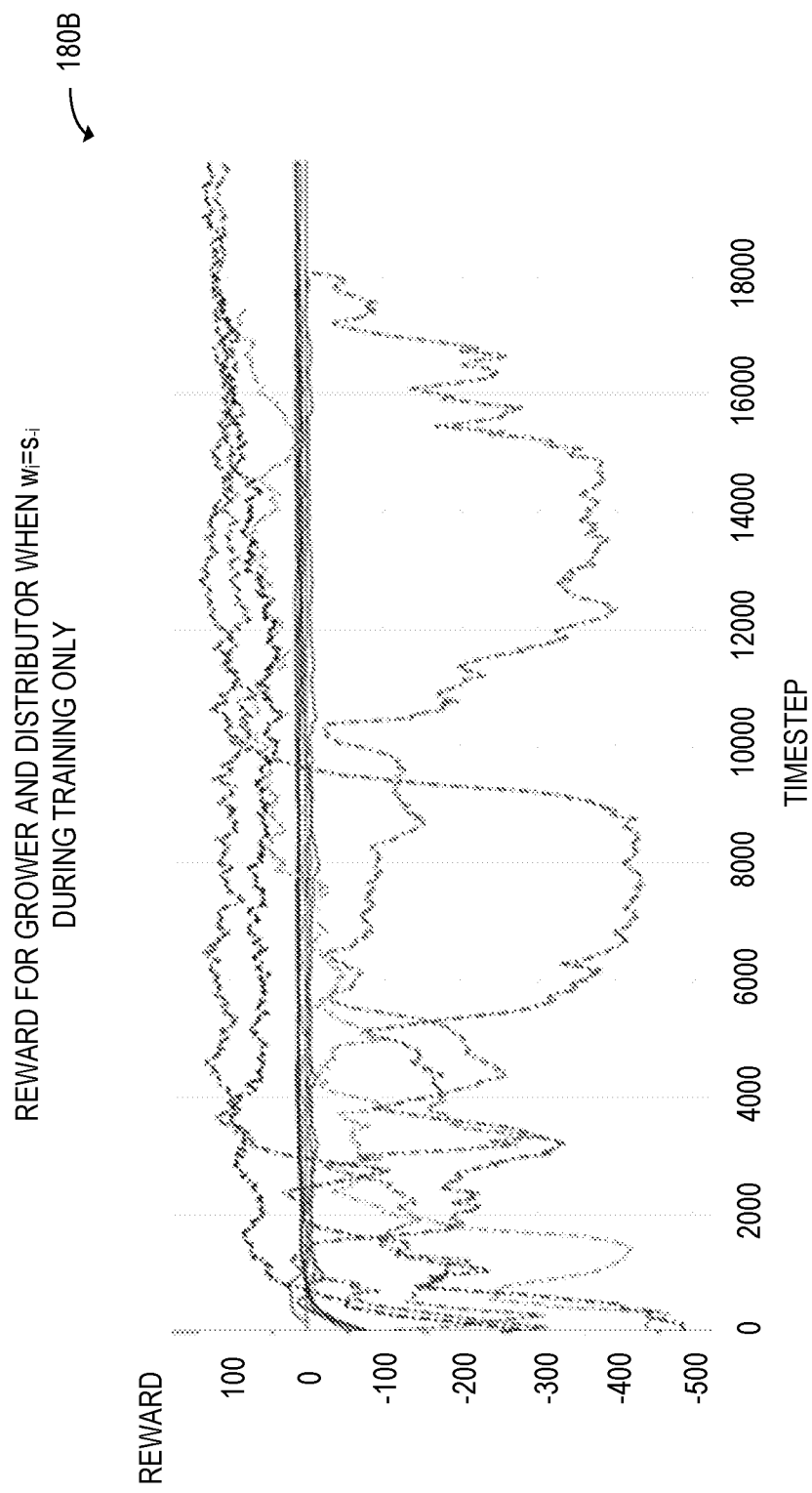
Figure 9C:
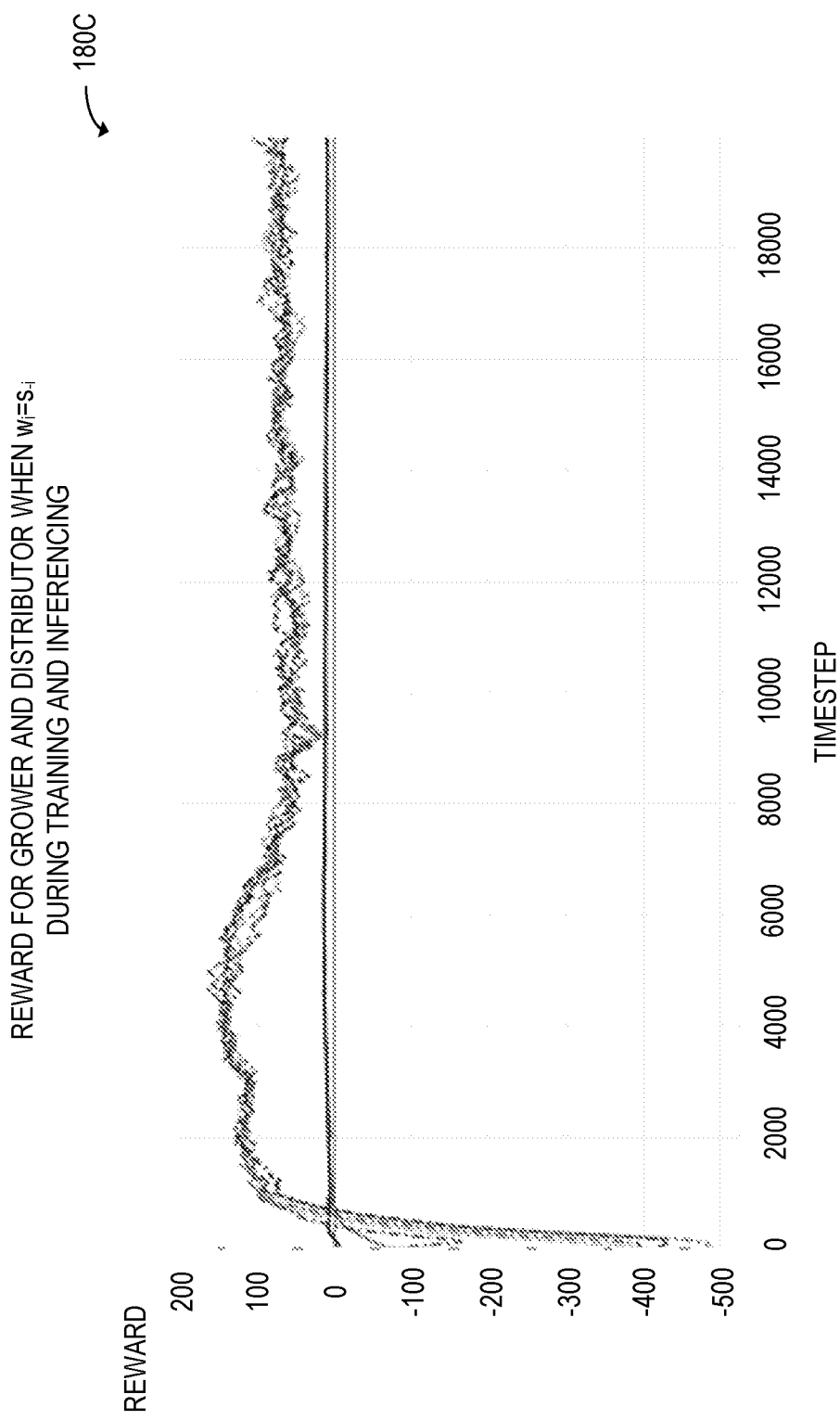

FIGS. 9A-9D respectively show a first example plot 180A, a second example plot 180B, a third example plot 180C, and a fourth example plot 180D of the rewards obtained by the grower (shown in solid lines) and the distributor (shown in dashed lines) over the timesteps in which the supply chain was simulated. The example plots show the grower's reward and the distributor's reward for five trials under each of the information-sharing conditions discussed above. The first example plot 180A, provided in FIG. 9A, shows the rewards when $w_i = \emptyset$ during training and inferencing. The second example plot 180B, provided in FIG. 9B, shows the rewards when $w_i = s_{-i}$ during training only. The third example plot 180C, provided in FIG. 9C, shows the rewards when $w_i = s_{-i}$ during training and inferencing. The fourth example plot 180D, provided in FIG. 9D, shows the rewards when $w_i = s_{-i}$, $a_{-i}$ during training and inferencing.

As shown in FIGS. 9A-9D, setting $w_i=s_{-i}$ during both training and inferencing allowed the rewards for both of the training-phase agents 22 to reach higher, more stable values than under conditions in which $w_i=\emptyset$ during training and inferencing, $w_i=s_{-i}$ during training only, or $w_i=s_{-i}, a_{-i}$ during both training and inferencing. In addition, higher and more stable rewards were achieved under the $w_i=\emptyset$ condition than under the condition in which $w_i=s_{-i}$ during training only. The condition in which $w_i=s_{-i}, a_{-i}$ during both training and inferencing had the lowest and least stable rewards among the tested conditions. For this reason, the sensor readout export interface element 74B and the runtime action export interface element 74G are provided in the example GUI 72 of FIG. 7 to enable the user to share sensor data 140 and runtime action outputs 126 with the computing system 10 to allow pooling of runtime forecast states 124 and runtime action outputs 126 during additional training of the reinforcement learning simulation 30.

Figure 10A:
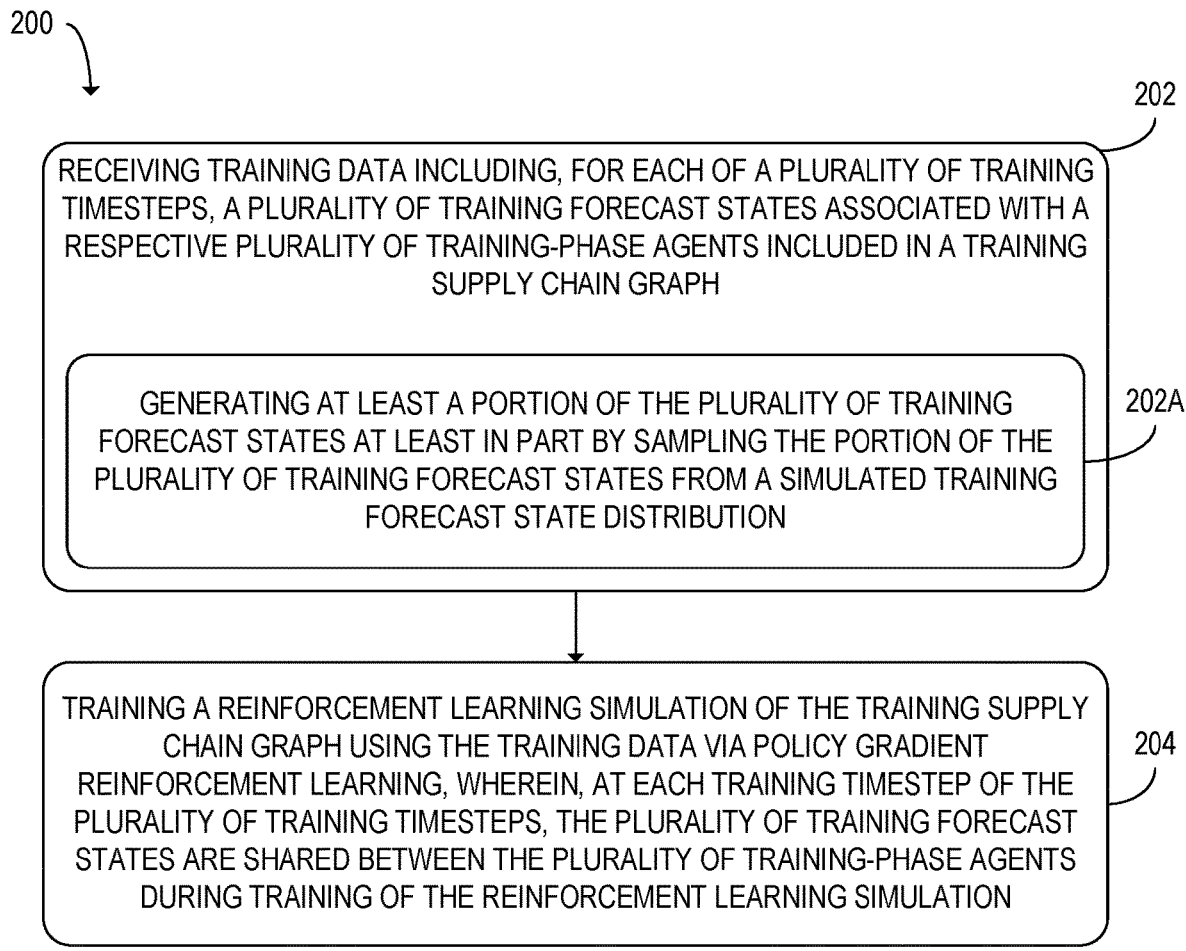
FIG. 10A shows a flowchart of an example method for use at a computing system during a training phase at which a reinforcement learning simulation is trained, according to the example of FIG. 1.

FIG. 10A shows a flowchart of a method 200 for use at a computing system when training a reinforcement learning simulation for modeling supply chains, according to one example. The method 200 may, for example, be performed at the computing system 10 of FIG. 1 during a training phase for the reinforcement learning simulation. At step 202, the method 200 may include receiving training data including, for each of a plurality of training timesteps, a plurality of training forecast states associated with a respective plurality of training-phase agents included in a training supply chain graph. The training-phase agents may each have respective reward functions. In the training-phase graph, the plurality of training-phase agents may be connected by a plurality of directed edges. The edges may represent transactions between the training-phase agents, and the directions of the edges may represent directions in which raw materials and products flow through the supply chain. The training-phase graph may further include a market supply node at as a furthest-upstream node and a market demand node as a furthest-downstream node.

During the training phase, the training supply chain graph may be simulated as a Markov decision process. The plurality of training-phase agents included in the training supply chain graph may have a plurality of respective reward functions that are neither fully correlated nor fully anticorrelated with each other. Thus, the interaction of the training-phase agents may be a mixed-motive game. In some examples, the reward for each of the training-phase agents may be a profit earned by that training-phase agent. In other examples, the reward for one or more of the training-phase agents may be based at least in part on one or more other variables.

In some examples, step 202 may include, at step 202A, generating at least a portion of the plurality of training forecast states at least in part by sampling the portion of the plurality of training forecast states from a simulated training forecast state distribution. For example, the simulated training forecast state distribution may be generated via regression performed on empirical data. Step 202A may, for example, be performed when the amount of empirical training forecast data is too small to allow an accurate reinforcement learning simulation to be trained.

At step 204, the method 200 may further include training a reinforcement learning simulation of the training supply chain graph using the training data via policy gradient reinforcement learning. For example, the reinforcement learning simulation may be trained via actor-critic reinforcement learning. In such examples, training the reinforcement learning simulation may include computing a training action output based at least in part on a plurality of actor network weights of an actor network and computing a value of an actor network objective function based at least in part on the actor network weights and the training action output. Performing actor-critic reinforcement learning may further include computing an estimated actor network gradient at a critic network based at least in part on the value of the actor network objective function, critic network weights of the critic network, and the value of a critic network loss function of the critic network. Gradient descent may then be performed using the estimated actor network gradient.

At each training timestep of the plurality of training timesteps, the plurality of training forecast states may be shared between the plurality of training-phase agents during training of the reinforcement learning simulation. Accordingly, at the actor network, the respective training action output for each training-phase agent may be generated based at least in part on the respective plurality of training forecast states of the plurality of training-phase agents at that timestep.

Figure 10B:
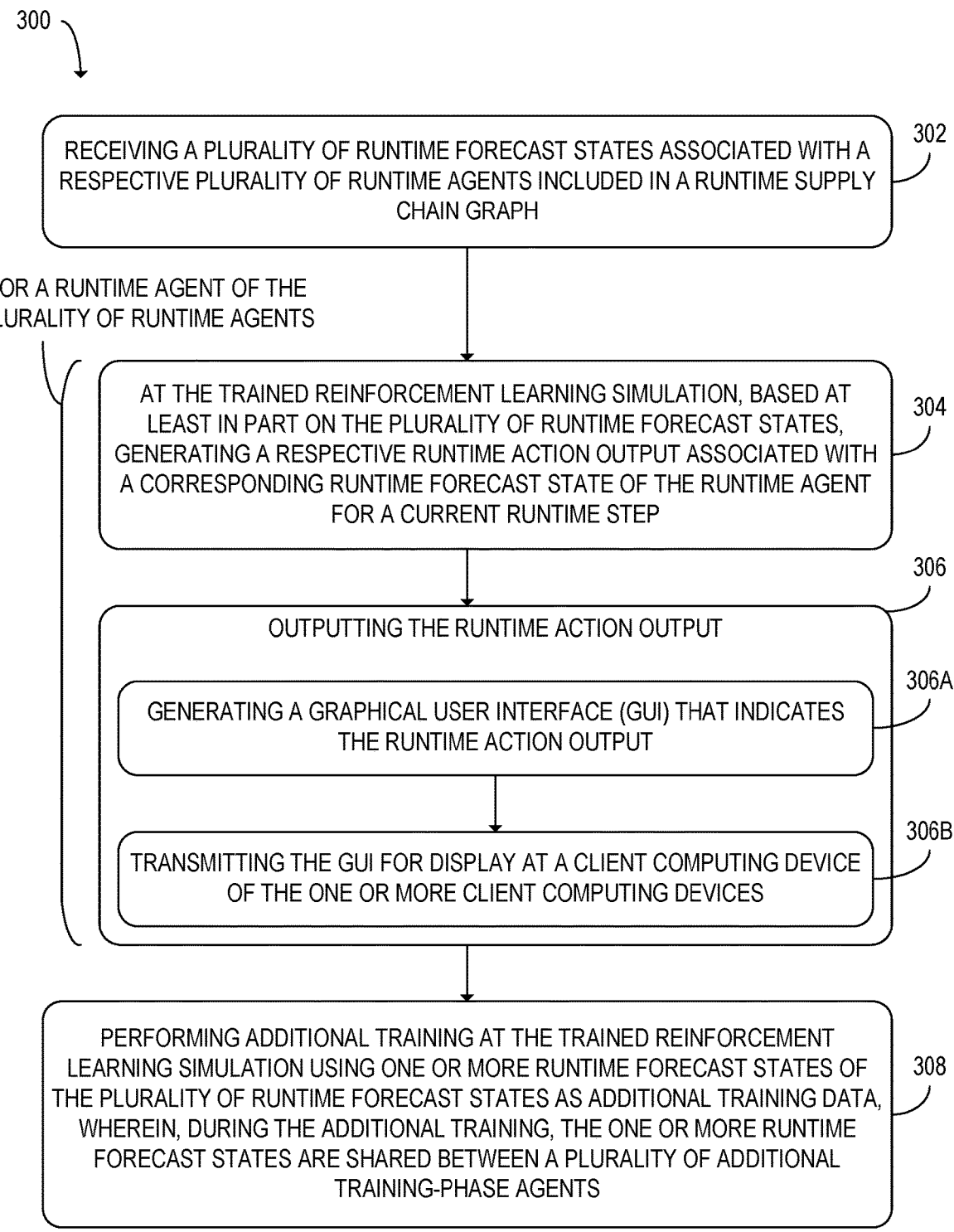
FIG. 10B shows a flowchart of an example method for use at a computing system during an inferencing phase at which the trained reinforcement learning simulation is executed, according to the example of FIG. 10A.

FIG. 10B shows a flowchart of an example method 300 for use at a computing system during an inferencing phase. The example method 300 utilizes a trained reinforcement learning simulation, which may be the reinforcement learning simulation trained according to the method 200 of FIG. 10A. At step 302, the method 300 may include receiving a plurality of runtime forecast states associated with a respective plurality of runtime agents included in a runtime supply chain graph. For example, the plurality of runtime forecast states may be received from one or more client computing devices. The runtime supply chain graph may be a graph representation of a real-world supply chain in which the runtime agents are connected by a plurality of directed edges that represent transactions between the runtime agents. Similarly to the training supply chain graph, the runtime supply chain graph may further include a market supply node at as a furthest-upstream node and a market demand node as a furthest-downstream node.

Step 304 and step 306 of the method 300 may be performed for a runtime agent of the plurality of runtime agents. In addition, step 304 and step 306 may each be performed in a sequential plurality of runtime steps for which the runtime supply chain graph is simulated. At step 304, the method 300 may further include, at the trained reinforcement learning simulation, generating a respective runtime action output associated with a corresponding runtime forecast state of the runtime agent for a current runtime step. The runtime action output may be generated based at least in part on the plurality of runtime forecast states. Thus, the forecast states of agents included in the supply chain graph may be shared at runtime as well as at training time. The runtime forecast states may be pooled at the computing system at which the trained reinforcement learning simulation is executed. Thus, when the runtime forecast states are generated based at least in part on proprietary data of the runtime agents, those runtime agents may achieve increases in reward resulting from runtime forecast state pooling without having to transmit their proprietary data to other runtime agents.

At step 306, the method 300 may further include outputting the runtime action output. The runtime action output may be stored in memory and/or output to one or more additional computing processes. In some examples in which the plurality of runtime forecast states are received from a plurality of client computing devices, step 306 may include, at step 306A, generating a GUI that indicates the runtime action output. In such examples, step 306 may further include, at step 306B, transmitting the GUI for display at a client computing device of the one or more client computing devices. The client computing device to which the GUI indicating the runtime action output is transmitted may be the client computing device from which the corresponding runtime forecast state was received.

In some examples, training of the reinforcement learning simulation may continue during the runtime phase. At step 308, the method 300 may further include performing additional training at the trained reinforcement learning simulation using one or more runtime forecast states of the plurality of runtime forecast states as additional training data. During the additional training, the one or more runtime forecast states may be shared between a plurality of additional training-phase agents. The runtime supply chain graph may be simulated as an additional training graph when the additional training is performed. The plurality of additional training-phase agents may be simulations of the plurality of runtime agents included in the runtime supply chain graph. In examples in which additional training is performed, the rewards obtained by the runtime agents when the runtime agents perform the actions indicated in the runtime action outputs may continue to increase during the runtime phase.

Figure 10C:
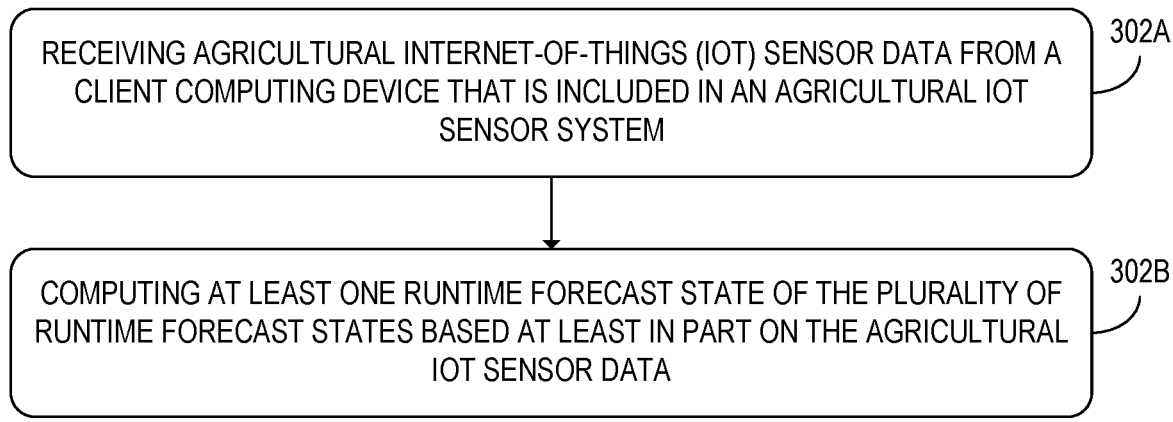
FIG. 10C shows additional steps of the method of FIG. 10B that may be performed in some examples when the runtime supply chain is an agricultural supply chain.
Figure 10D:
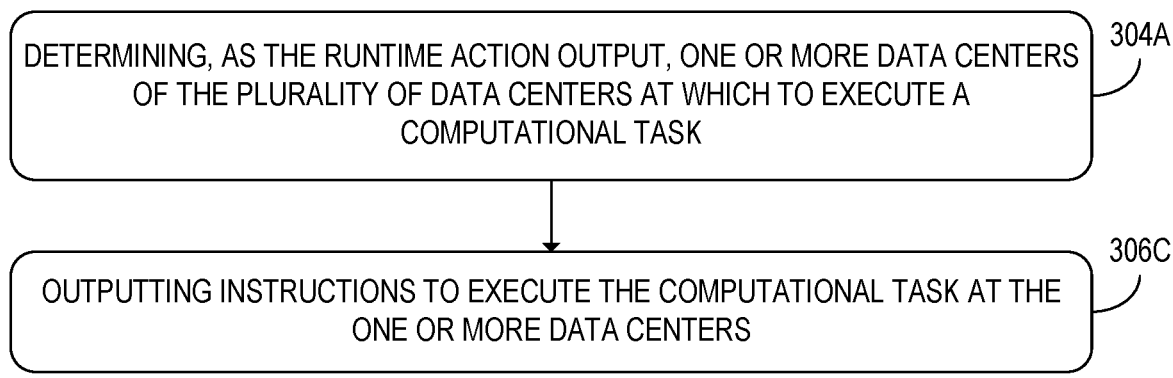
FIG. 10D shows additional steps of the method of FIG. 10B that may be performed in some examples when the runtime supply chain graph represents electrical power supplied to a plurality of data centers.

FIGS. 10C-10D show additional steps of the method 300 that may be performed in some examples. The steps of FIG. 10C may be performed in examples in which the runtime supply chain is an agricultural supply chain. At step 302A, step 302 of the method 300 may include receiving agricultural IoT sensor data from a client computing device that is included in an agricultural IoT sensor system. At step 302B, step 302 of the method 300 may further include computing at least one runtime forecast state of the plurality of runtime forecast states based at least in part on the agricultural IoT sensor data. Accordingly, computation of the at least one runtime forecast state may be offloaded to the computing system in thin-client agricultural IoT use case scenarios.

The steps of FIG. 10D may be performed in examples in which the runtime supply chain graph represents electrical power supplied to a plurality of data centers. For example, the steps of FIG. 10D may be performed in examples in which the runtime supply chain graph includes one or more suppliers and one or more demanders of a cloud computing service. At step 304A, step 304 of the method 300 may include determining, as the runtime action output, one or more data centers of the plurality of data centers at which to execute a computational task. For example, the computational task may be specified by a client computing device that is offloading the computational task to the one or more data centers. At step 306C, step 306 of the method 300 may include outputting instructions to execute the computational task at the one or more data centers. Thus, the reinforcement learning simulation may be used to programmatically assign the computational task to a data center of the plurality of data centers.

Using the systems and methods discussed above, participants in a supply chain may inform their pricing and purchase quantity decisions by referring to a reinforcement learning simulation of the supply chain. By taking the runtime output actions generated at the reinforcement learning simulation, participants in the supply chain may increase their individual rewards. The systems and methods discussed above may also allow the agents to reduce bottlenecks, shortages, and waste in the supply chain that would otherwise result from making pricing and purchase quantity decisions based on inaccurate predictions. In addition, when forecasts made by participants in the supply chain are pooled during training and execution of the reinforcement learning simulation, the rewards for those participants, as well as the stability of those rewards, may increase. These increases in reward and reward stability may also extend to agents that are included in the supply chain but do not utilize the reinforcement learning simulation or share their forecast states. Thus, the systems and methods discussed above may allow for broad increases in supply chain efficiency.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
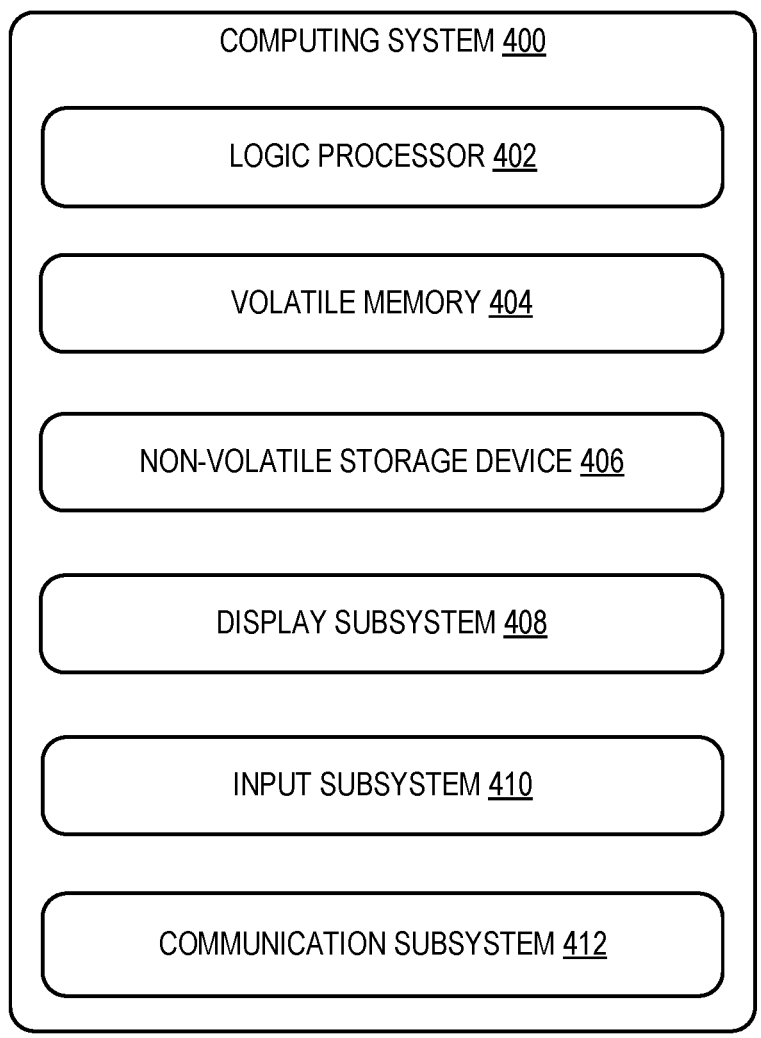
FIG. 11 shows a schematic view of an example computing environment in which the computing system of FIG. 1 may be enacted.

FIG. 11 schematically shows a non-limiting embodiment of a computing system 400 that can enact one or more of the methods and processes described above. Computing system 400 is shown in simplified form. Computing system 400 may embody the computing system 10 described above and illustrated in FIG. 1. Components of the computing system 400 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 11.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing system is provided, including a processor configured to, during a training phase, receive training data including a plurality of training forecast states associated with a respective plurality of training-phase agents included in a training supply chain graph for each of a plurality of training timesteps. The processor may be further configured to train a reinforcement learning simulation of the training supply chain graph using the training data via policy gradient reinforcement learning. At each training timestep of the plurality of training timesteps, the plurality of training forecast states may be shared between the plurality of training-phase agents during training of the reinforcement learning simulation. During an inferencing phase, the processor may be further configured to receive a plurality of runtime forecast states associated with a respective plurality of runtime agents included in a runtime supply chain graph. For a runtime agent of the plurality of runtime agents, at the trained reinforcement learning simulation the processor may be further configured to generate a respective runtime action output associated with a corresponding runtime forecast state of the runtime agent for a current runtime step based at least in part on the plurality of runtime forecast states. The processor may be further configured to output the runtime action output.

According to this aspect, the reinforcement learning simulation is trained via actor-critic reinforcement learning.

According to this aspect, the processor may be further configured to generate at least a portion of the plurality of training forecast states at least in part by sampling the portion of the plurality of training forecast states from a simulated training forecast state distribution.

According to this aspect, the plurality of training forecast states are sampled from a continuous forecast state space.

According to this aspect, the processor may be configured to simulate the training supply chain graph as a Markov decision process during the training phase.

According to this aspect, the plurality of training-phase agents may have a plurality of respective reward functions that are neither fully correlated nor fully anticorrelated with each other.

According to this aspect, the processor may be configured to receive the plurality of runtime forecast states from one or more client computing devices. The processor may be further configured to output the runtime action output at least in part by generating a graphical user interface (GUI)

that indicates the runtime action output and transmitting the GUI for display at a client computing device of the one or more client computing devices.

According to this aspect, the processor may be further configured to perform additional training at the trained reinforcement learning simulation using one or more runtime forecast states of the plurality of runtime forecast states as additional training data. During the additional training, the one or more runtime forecast states may be shared between a plurality of additional training-phase agents.

According to this aspect, the processor may be further configured to receive agricultural Internet-of-Things (IoT) sensor data from a client computing device that is included in an agricultural IoT sensor system. The processor may be further configured to compute at least one runtime forecast state of the plurality of runtime forecast states based at least in part on the agricultural IoT sensor data.

According to this aspect, the runtime supply chain graph may represent electrical power supplied to a plurality of data centers. The processor may be further configured to determine, as the runtime action output, one or more data centers of the plurality of data centers at which to execute a computational task. The processor may be further configured to output instructions to execute the computational task at the one or more data centers.

According to this aspect, the plurality of runtime forecast states may each include one or more upstream price forecasts and one or more downstream demand forecasts. The plurality of runtime action outputs may each include one or more upstream purchase quantities and one or more downstream sale prices.

According to another aspect of the present disclosure, a method for use at a computing system is provided. The method may include, during a training phase, receiving training data including a plurality of training forecast states associated with a respective plurality of training-phase agents included in a training supply chain graph for each of a plurality of training timesteps. The method may further include training a reinforcement learning simulation of the training supply chain graph using the training data via policy gradient reinforcement learning. At each training timestep of the plurality of training timesteps, the plurality of training forecast states may be shared between the plurality of training-phase agents during training of the reinforcement learning simulation. The method may further include, during an inferencing phase, receiving a plurality of runtime forecast states associated with a respective plurality of runtime agents included in a runtime supply chain graph. The method may further include, for a runtime agent of the plurality of runtime agents, at the trained reinforcement learning simulation, generating a respective runtime action output associated with a corresponding runtime forecast state of the runtime agent for a current runtime step based at least in part on the plurality of runtime forecast states. The method may further include outputting the runtime action output.

According to this aspect, the reinforcement learning simulation may be trained via actor-critic reinforcement learning.

According to this aspect, the method may further include generating at least a portion of the plurality of training forecast states at least in part by sampling the portion of the plurality of training forecast states from a simulated training forecast state distribution.

According to this aspect, the training supply chain graph may be simulated as a Markov decision process during the training phase.

According to this aspect, the plurality of runtime forecast states may be received from one or more client computing devices. Outputting the runtime action output may include generating a graphical user interface (GUI) that indicates the runtime action output and transmitting the GUI for display at a client computing device of the one or more client computing devices.

According to this aspect, the method may further include performing additional training at the trained reinforcement learning simulation using one or more runtime forecast states of the plurality of runtime forecast states as additional training data. During the additional training, the one or more runtime forecast states may be shared between a plurality of additional training-phase agents.

According to this aspect, the runtime supply chain graph may represent electrical power supplied to a plurality of data centers. The method may further include determining, as the runtime action output, one or more data centers of the plurality of data centers at which to execute a computational task. The method may further include outputting instructions to execute the computational task at the one or more data centers.

According to another aspect of the present disclosure, a computing system is provided, including a processor configured to receive, from one or more client computing devices, a plurality of runtime forecast states associated with a respective plurality of runtime agents included in a runtime supply chain graph. For a runtime agent of the plurality of runtime agents, at the trained reinforcement learning simulation, the processor may be further configured to generate a respective runtime action output associated with a corresponding runtime forecast state of the runtime agent for a current runtime step based at least in part on the plurality of runtime forecast states. The processor may be further configured to generate a graphical user interface (GUI) that indicates the runtime action output. The processor may be further configured to transmit the GUI for display at a client computing device of the one or more client computing devices. The processor may be further configured to perform additional training at the trained reinforcement learning simulation using the runtime forecast state as additional training data. During the additional training, the runtime forecast state may be shared between a plurality of simulations of the plurality of runtime agents.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a computing device including a processor and memory storing instructions that cause the processor to:
during a training phase:
receive training data including, for each of a plurality of training timesteps, a plurality of training forecast states associated with a respective plurality of training-phase agents included in a training supply chain graph; and
train a reinforcement learning model of the training supply chain graph using the training data via policy gradient reinforcement learning, the reinforcement learning model including one or more neural networks, wherein, at each training timestep of the plurality of training timesteps, the instructions cause the processor to set a first plurality of additional observations for each of the training-phase agents, the first plurality of additional observations including the respective training forecast states associated with each other training-phase agent of the plurality of training-phase agents;
during an inferencing phase:
receive a plurality of runtime forecast states associated with a respective plurality of runtime agents included in a runtime supply chain graph; and
for a runtime agent of the plurality of runtime agents:
at the trained reinforcement learning model, based at least in part on the plurality of runtime forecast states, generate a respective first runtime action output associated with a corresponding runtime forecast state of the runtime agent for a current runtime step; and
output the first runtime action output;
retrain the trained reinforcement learning model using one or more runtime forecast states of the plurality of runtime forecast states as additional training data, wherein, during the retraining, the instructions cause the processor to set a second plurality of additional observations for a plurality of additional training-phase agents, the second plurality of additional observations including the one or more runtime forecast states associated with each other additional training-phase agent of the plurality of additional training-phase agents;
output a second runtime action output of the retrained reinforcement learning model that is different from the first runtime action output;
generate a graphical user interface (GUI) that indicates at least the second runtime action output;
transmit the GUI for display at a client computing device included among one or more client computing devices; and
receive, at the GUI, a user selection of the second runtime action output to programmatically perform resource allocation at a supply chain, thereby reducing bottlenecking, shortages, and/or waste in the supply chain.

2. The computing system of claim 1, wherein the reinforcement learning model is trained via actor-critic reinforcement learning.

3. The computing system of claim 1, wherein the instructions further cause the processor to generate at least a portion of the plurality of training forecast states at least in part by sampling the portion of the plurality of training forecast states from a simulated training forecast state distribution.

4. The computing system of claim 3, wherein the plurality of training forecast states are sampled from a continuous forecast state space.

5. The computing system of claim 1, wherein the instructions cause the processor to simulate the training supply chain graph as a Markov decision process during the training phase.

6. The computing system of claim 1, wherein the plurality of training-phase agents have a plurality of respective reward functions that are neither fully correlated nor fully anticorrelated with each other.

7. The computing system of claim 1, wherein:
the instructions cause the processor to receive the plurality of runtime forecast states from the one or more client computing devices; and
the instructions further cause the processor to output the first runtime action output at least in part by:
generating the GUI to indicate the first runtime action output; and
transmitting the GUI for display at the client computing device.

8. The computing system of claim 1, wherein the instructions further cause the processor to:
receive agricultural Internet-of-Things (IoT) sensor data from the client computing device, wherein the client computing device is included in an agricultural IoT sensor system; and
compute at least one runtime forecast state of the plurality of runtime forecast states based at least in part on the agricultural IoT sensor data.

9. The computing system of claim 1, wherein:
the runtime supply chain graph represents electrical power supplied to a plurality of data centers; and
the instructions further cause the processor to:
determine, as the first runtime action output, one or more data centers of the plurality of data centers at which to execute a computational task; and
output instructions to execute the computational task at the one or more data centers.

10. The computing system of claim 1, wherein:
the plurality of runtime forecast states each include one or more upstream price forecasts and one or more downstream demand forecasts; and
the first runtime action output and the second runtime action output each include one or more respective upstream purchase quantities and one or more respective downstream sale prices.

11. The computing system of claim 1, wherein:
the training supply chain graph is a directed graph including training graph edges in respective directions that indicate directions in which materials and/or products move between the training-phase agents through the supply chain; and
the training supply chain graph includes:
a market supply node and a market demand node at respective endpoints of the training supply chain graph; and
a plurality of nodes positioned on the training supply chain graph intermediate the endpoints.

12. A method for use at a computing system, the method comprising:
during a training phase:

receiving training data including, for each of a plurality of training timesteps, a plurality of training forecast states associated with a respective plurality of training-phase agents included in a training supply chain graph; and training a reinforcement learning model of the training supply chain graph using the training data via policy gradient reinforcement learning, the reinforcement learning model including one or more neural networks, wherein, at each training timestep of the plurality of training timesteps, the method further comprises setting a first plurality of additional observations for each of the training-phase agents, the first plurality of additional observations including the respective training forecast states associated with each other training-phase agent of the plurality of training-phase agents;

during an inferencing phase:
receiving a plurality of runtime forecast states associated with a respective plurality of runtime agents included in a runtime supply chain graph; and for a runtime agent of the plurality of runtime agents:
at the trained reinforcement learning model, based at least in part on the plurality of runtime forecast states, generating a respective first runtime action output associated with a corresponding runtime forecast state of the runtime agent for a current runtime step; and outputting the first runtime action output;

retraining the trained reinforcement learning model using one or more runtime forecast states of the plurality of runtime forecast states as additional training data, wherein, during the retraining, the method further comprises setting a second plurality of additional observations for a plurality of additional training-phase agents, the second plurality of additional observations including the one or more runtime forecast states associated with each other additional training-phase agent of the plurality of additional training-phase agents;

outputting a second runtime action output of the retrained reinforcement learning model that is different from the first runtime action output;

generating a graphical user interface (GUI) that indicates at least the second runtime action output;

transmitting the GUI for display at a client computing device included among one or more client computing devices; and receiving, at the GUI, a user selection of the second runtime action output to programmatically perform resource allocation at a supply chain, thereby reducing bottlenecking, shortages, and/or waste in the supply chain.

13. The method of claim 12, wherein the reinforcement learning model is trained via actor-critic reinforcement learning.

14. The method of claim 12, further comprising generating at least a portion of the plurality of training forecast states at least in part by sampling the portion of the plurality of training forecast states from a simulated training forecast state distribution.

15. The method of claim 12, wherein the training supply chain graph is simulated as a Markov decision process during the training phase.

16. The method of claim 12, wherein the plurality of training-phase agents have a plurality of respective reward functions that are neither fully correlated nor fully anticorrelated with each other.

17. The method of claim 12, wherein:
the plurality of runtime forecast states are received from the one or more client computing devices; and
outputting the first runtime action output includes:
generating the GUI to indicate the first runtime action output; and
transmitting the GUI for display at the client computing device.

18. The method of claim 12, wherein:
the runtime supply chain graph represents electrical power supplied to a plurality of data centers; and
the method further comprises:
determining, as the first runtime action output, one or more data centers of the plurality of data centers at which to execute a computational task; and
outputting instructions to execute the computational task at the one or more data centers.

19. The method of claim 12, wherein:
the training supply chain graph is a directed graph including training graph edges in respective directions that indicate directions in which materials and/or products move between the training-phase agents through the supply chain; and
the training supply chain graph includes:
a market supply node and a market demand node at respective endpoints of the training supply chain graph; and
a plurality of nodes positioned on the training supply chain graph intermediate the endpoints.

20. A computing system comprising:
a computing device including a processor and memory storing instructions that cause the processor to:
receive, from one or more client computing devices, a plurality of runtime forecast states associated with a respective plurality of runtime agents included in a runtime supply chain graph; and
for a runtime agent of the plurality of runtime agents:
at a trained reinforcement learning model including one or more neural networks, based at least in part on the plurality of runtime forecast states, generate a respective first runtime action output associated with a corresponding runtime forecast state of the runtime agent for a current runtime step;
generate a graphical user interface (GUI) that indicates the first runtime action output;
transmit the GUI for display at a client computing device of the one or more client computing devices;
retrain the trained reinforcement learning model using the runtime forecast state as additional training data, wherein, during the additional training, the instructions cause the processor to set a plurality of additional observations for each of the runtime agents, the plurality of additional observations including the respective runtime forecast states associated with each other runtime agent of the plurality of runtime agents;
output a second runtime action output of the retrained reinforcement learning model that is different from the first runtime action output;
transmit the second runtime action output for display at the GUI; and
receive, at the GUI, a user selection of the second runtime action output to programmatically perform resource allocation at a supply chain, thereby reducing bottlenecking, shortages, and/or waste in the supply chain.

\* \* \* \* \*